US011935419B2

(12) United States Patent
Dziecielski et al.

(10) Patent No.: US 11,935,419 B2
(45) Date of Patent: Mar. 19, 2024

(54) HOLDING PATTERN DETECTION AND MANAGEMENT

(71) Applicant: THE BOEING COMPANY, Chicago, IL (US)

(72) Inventors: Jakub Dziecielski, Gdansk (PL); Michal Kowalewski, Gdynia (PL); Piotr Mazur, Gdansk (PL); Anna Neumann, Gdansk (PL); Anna Meringer, Gdansk (PL); Jonasz Rudnick, Gdansk (PL)

(73) Assignee: THE BOEING COMPANY, Arlington, VA (US)

( * ) Notice: Subject to any disclaimer, the term of this patent is extended or adjusted under 35 U.S.C. 154(b) by 205 days.

(21) Appl. No.: 16/687,420

(22) Filed: Nov. 18, 2019

(65) Prior Publication Data

US 2021/0027636 A1 Jan. 28, 2021

Related U.S. Application Data

(63) Continuation-in-part of application No. 16/518,092, filed on Jul. 22, 2019, now Pat. No. 11,645,927.

(51) Int. Cl.
*G08G 5/00* (2006.01)

(52) U.S. Cl.
CPC ......... *G08G 5/0043* (2013.01); *G08G 5/0013* (2013.01); *G08G 5/0026* (2013.01); *G08G 5/0039* (2013.01)

(58) Field of Classification Search
CPC .. G08G 5/0043; G08G 5/0013; G08G 5/0026; G08G 5/0039; G08G 5/008
See application file for complete search history.

(56) References Cited

U.S. PATENT DOCUMENTS

| | | | | |
|---|---|---|---|---|
| 5,398,186 | A | 3/1995 | Nakhla | |
| 7,546,206 | B1 * | 6/2009 | Miller | G08G 5/0091 701/120 |
| 8,666,649 | B2 | 3/2014 | Otto et al. | |

(Continued)

FOREIGN PATENT DOCUMENTS

| | | | | |
|---|---|---|---|---|
| CN | 106251706 | A | 12/2016 | |
| CN | 108694861 | A | 10/2018 | |
| WO | WO-2011057323 | A1 * | 5/2011 | G01C 21/005 |

OTHER PUBLICATIONS

European Patent Office Extended European Search Report for Application No. 20186650.6-1203 dated Dec. 9, 2020.

(Continued)

*Primary Examiner* — Aniss Chad
*Assistant Examiner* — Christopher George Fees
(74) *Attorney, Agent, or Firm* — Patterson + Sheridan, LLP

(57) ABSTRACT

The present disclosure provides for holding pattern detection and management by identifying from flight data for an aircraft that the aircraft has performed a first turn, followed by a leg traverse, and followed by a second turn in a direction circuitous to the first turn and indicating that the aircraft is in a holding pattern and/or identifying from flight data that the aircraft has passed within a predefined distance of a fixpoint and in response to identifying that the aircraft has performed a turn in a known direction associated with a historical holding pattern charted from the fixpoint, indicating that the aircraft is in a holding pattern.

20 Claims, 12 Drawing Sheets

(56) References Cited

U.S. PATENT DOCUMENTS

| | | | | |
|---|---|---|---|---|
| 9,002,628 | B2 * | 4/2015 | Wilder | G08G 5/025 701/122 |
| 9,076,327 | B1 | 7/2015 | Baiada et al. | |
| 9,171,473 | B1 | 10/2015 | McNally et al. | |
| 9,640,079 | B1 * | 5/2017 | Moravek | G08G 5/0021 |
| 10,001,546 | B2 * | 6/2018 | Gibson | G08G 5/0026 |
| 10,019,905 | B1 * | 7/2018 | Kneuper | G08G 5/0039 |
| 2011/0246002 | A1 * | 10/2011 | Shavit | G08G 5/0043 701/14 |
| 2012/0218127 | A1 | 8/2012 | Kroen | |
| 2013/0179059 | A1 * | 7/2013 | Otto | G06Q 50/30 701/120 |
| 2016/0155342 | A1 * | 6/2016 | Gibson | G08G 5/0082 701/409 |
| 2018/0102056 | A1 | 4/2018 | Leber et al. | |
| 2018/0129635 | A1 * | 5/2018 | Saptharishi | B64D 43/00 |
| 2018/0144643 | A1 | 5/2018 | Moravek et al. | |
| 2018/0322793 | A1 * | 11/2018 | Huang | G08G 5/0013 |
| 2019/0057327 | A1 | 2/2019 | Arguello et al. | |
| 2019/0066520 | A1 | 2/2019 | Schwartz et al. | |
| 2019/0147748 | A1 | 5/2019 | Boozarjomehri et al. | |
| 2019/0213891 | A1 * | 7/2019 | Snyder | G08G 5/0013 |
| 2020/0105148 | A1 * | 4/2020 | DeWeese | B64D 43/00 |
| 2020/0294405 | A1 * | 9/2020 | Foltan | G08G 5/0013 |

OTHER PUBLICATIONS

Kern et al., "Data-driven aircraft estimated time of arrival prediction," 2015 Annual IEEE Systems Conference (SysCon) Proceedings, Apr. 13-16, 2015.

European Patent Office, Communication pursuant to Article 94(3) EPC for Application 20 186 650.6-1213 dated Oct. 19, 2023.

National Intellectual Property Administration, PRC, Notification of The First Office Action for Application 2020106992434 dated Aug. 30, 2023.

* cited by examiner

HOLDING PATTERN DETECTION AND MANAGEMENT

CROSS-REFERENCE TO RELATED APPLICATIONS

The present disclosure is a continuation in part of U.S. patent application Ser. No. 16/518,092, filed on Jul. 22, 2019 entitled "PREDICTIVE FLIGHT DIVERSION MANAGEMENT", which is incorporated herein in its entirety.

FIELD

Aspects of the present disclosure relate to flight management. More particularly, the present disclosure relates to Artificial Intelligence systems using real-time data to predict and manage flights in holding patterns, and to provide accurate arrival times of those flights.

BACKGROUND

A diversion refers to a change in a flight plan that affects the destination of the flight (i.e., where and when the aircraft actually lands). For example, an aircraft originally destined for airport A may divert to airport B when airport A is experiencing inclement weather, is experiencing runway congestion, etc., or when the aircraft is low on fuel, when technical difficulties occur, when a person on board the aircraft is experiencing a medical issue, etc. Whether an event affects multiple aircraft (e.g., a diverting event at an airport or along a flight corridor) or a single aircraft, the diverted aircraft, its passengers, cargo, and crew need to be received and processed by the new destination, which may affect the other aircraft destined for that airport (either originally or due to a diversion), which can cascade into further delays or secondary diversions. Conventionally, aircraft dispatchers have therefore resorted to instructing aircraft not experiencing any issues enter a holding pattern (e.g., to circle an original destination airport) until a diverting event affecting that destination airport ends in order to reduce the number of diversions. Unfortunately, this conventional practice creates additional complexities in the greater air traffic system and results in negative passenger experiences, increased wear on aircraft, increased crew fatigue, and other issues.

A holding pattern refers to a series of flight maneuvers to keep an inflight aircraft aloft and available to receive further commands, but not progressing towards a destination. For example, when approaching airport A, when the runways are not yet available for landing, an aircraft may be instructed to hold and will fly around a set airspace (e.g., near airport A) until a runway is available. In another example, while en route to airport A, an aircraft may be instructed to hold and fly around a set airspace near airport B while determining whether to divert the aircraft to airport B. Various holding patterns at various altitudes can accommodate several in-flight aircraft around a given location. For example, several aircraft may circle an airport or designated holding pattern airspace at different altitudes or at different positions around a path at the same altitude.

SUMMARY

The present disclosure provides a method for holding pattern detection and management that includes: identifying from flight data for an aircraft that the aircraft has performed a first turn; identifying from the flight data that the aircraft has performed a leg traverse after performing the first turn; and in response to identifying from the flight data that the aircraft has performed a second turn in a direction circuitous to the first turn after performing the leg traverse, indicating that the aircraft is in a holding pattern.

In some aspects, according to any method described above or below, the first turn and the second turn are identified as turns based on the flight data for the aircraft indicating that the aircraft performed a course change between 90 and 270 degrees from an inbound leg.

In some aspects, according to any method described above or below, a turn consists of a sequence of samples from the flight data in which a direction of the course change is constant.

In some aspects, according to any method described above or below, the leg traverse consists of a sequence of samples from the flight data in which a cumulative turn is less than a predefined arc threshold and a length of travel is less than a predefined distance threshold.

In some aspects, according to any method described above or below, the flight data indicate that the aircraft is at least a predefined distance from an origin airport and above a predefined altitude when indicating that the aircraft is in the holding pattern.

In some aspects, according to any method described above or below, the method further includes: identifying an entry point of the holding pattern at which the first turn began; and continuing to indicate that the aircraft is in the holding pattern until the aircraft is a predefined distance away from the entry point or drops below a predefined altitude.

In some aspects, according to any method described above or below, the method further includes: receiving weather data for a zone of air traffic control; receiving flight tracking data for a plurality of aircraft travelling in the zone of air traffic control; making holding determinations for the plurality of aircraft; determining capacity rates for a plurality of airports in the zone of air traffic control, based on the flight tracking data; and in response to receiving a diversion trigger from a predictive model predicting a diversion event, identifying, based on the weather data, the flight tracking data, the holding determinations, and the capacity rates, a subset of aircraft from the plurality of aircraft that are to be diverted from original destinations in the zone of air traffic control to new destinations.

The present disclosure provides a method for holding pattern detection and management that includes: identifying from flight data for an aircraft that the aircraft has passed within a predefined distance of a fixpoint; and in response to identifying from the flight data that the aircraft has performed a turn in a known direction associated with a historical holding pattern charted from the fixpoint, indicating that the aircraft is in a holding pattern.

In some aspects, according to any method described above or below, the method further includes: identifying from flight data for the aircraft that the aircraft has passed within a second predefined distance of a second fixpoint; and in response to identifying from the flight data that the aircraft has performed a second turn that is not in a second known direction associated with a second historical holding pattern charted from the second fixpoint, indicating that the aircraft is not in a second holding pattern.

In some aspects, according to any method described above or below, the turn is identified based on the flight data for the aircraft indicating that the aircraft performed a course change between 90 and 270 degrees from an inbound leg.

In some aspects, according to any method described above or below, a turn consists of a sequence of samples from the flight data in which a direction of the course change is constant In some aspects, according to any method described above or below, the flight data indicate that the aircraft is at least a predefined distance from an origin airport and above a predefined altitude when indicating that the aircraft is in the holding pattern.

In some aspects, according to any method described above or below, the method further includes: continuing to indicate that the aircraft is in the holding pattern until the aircraft is a predefined distance away from the fixpoint or drops below a predefined altitude.

In some aspects, according to any method described above or below, the method further includes: receiving weather data for a zone of air traffic control; receiving flight tracking data for a plurality of aircraft travelling in the zone of air traffic control; making holding determinations for the plurality of aircraft; determining capacity rates for a plurality of airports in the zone of air traffic control, based on the flight tracking data; and in response to receiving a diversion trigger from a predictive model predicting a diversion event, identifying, based on the weather data, the flight tracking data, the holding determinations, and the capacity rates, a subset of aircraft from the plurality of aircraft that are to be diverted from original destinations in the zone of air traffic control to new destinations.

The present disclosure provides a system for holding pattern detection and management that includes: a processor; and a memory storage device including instructions that when executed by the processor provide: a holding detection module, configured to determine whether each aircraft of a plurality of aircraft are progressing towards a destination or in a holding pattern based on flight tracking data indicating progressive trajectories or holding trajectories for the plurality of aircraft; a diversion prediction module, configured to determine diversion likelihoods for each aircraft of the plurality of aircraft diverting to a new destination airport based on weather data, flight tracking data, and holding determinations for the plurality of aircraft; a disruption prediction module, configured to determine a disruption likelihood for each airport of a plurality of airports being disrupted by diverting aircraft of the plurality of aircraft to an individual airport based on the weather data, the flight tracking data, airport operating conditions, the holding determinations, and the diversion likelihoods; and a recommendation module, configured to output a predefined number of candidate airports with lowest disruption likelihoods for each aircraft of the plurality of aircraft.

In some aspects, according to any system described above or below, the holding pattern for a given aircraft is identified by identifying from flight data for the given aircraft that the given aircraft has passed within a predefined distance of a fixpoint and performed a turn in a known direction associated with a historical holding pattern charted from the fixpoint.

In some aspects, according to any system described above or below, the instructions when executed by the processor further provide: an Estimated Time of Arrival (ETA) prediction module, configured to determine ETAs for each aircraft diverting each candidate new destination identified by the diversion prediction module based on the weather data, the holding determinations, and the flight tracking data.

In some aspects, according to any system described above or below, the diversion prediction module includes: a diversion detection model, trained to predict when a given aircraft is to be diverted from an original destination based on the weather data, the flight tracking data, the holding determinations, and the airport operating conditions; and a new destination prediction model, trained to identify candidate airports to divert the given aircraft to based on the flight tracking data and airport operating conditions.

In some aspects, according to any system described above or below, the recommendation module transmits an alert to a flight dispatcher associated with a given diverted aircraft that identifies the predefined number of candidate airports, and is further configured to receive a selection of a given candidate airport from the flight dispatcher, and in response to receiving the selection, update the airport operating conditions based on the selection.

In some aspects, according to any system described above or below, the holding detection module maintains the holding determinations until an associated aircraft descends below a threshold altitude or proceeds a defined distance from a flightpath for the holding pattern.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure relates to systems and methods for predictive flight tracking and management, using flight tracking data (e.g., ADS-B (Automatic Dependent Surveillance-Broadcast) data), airport operational data, and weather data in real-time to predict and manage flight diversions from initial destinations to new destinations. Artificial Intelligence (AI) models trained on historical flight diversion data and provided with real-time data from flight tracking and transponder systems (such as ADS-B systems), weather tracking systems (e.g., METAR (Meteorological Aerodrome Reports), Terminal Aerodrome Forecasts (TAF)), and operators (e.g., airline operating instructions, aircraft capabilities, airport capabilities) to predict when a flight is expected to require a diversion and to proactively recommend a diversion destination for that flight.

By gathering data in real-time from many flights, an understanding of the real-time operations of individual airports relative to the capacities of those airports may be established, which allows a dispatcher to divert aircraft sooner and with fewer delays or secondary diversions, and with fewer communications between ground personnel and individual aircraft. Accordingly, practitioners of the present disclosure may expect reduced airport congestion, reduced aircraft hold/linger time, and reduced communications volumes to implement diversions (e.g., Air Traffic Control (ATC) radio traffic). Practitioners may also realize fuel savings, increased passenger satisfaction, and reduced sequential disruptions (e.g., missed connecting flights, re-homing of diverted aircraft and crews, and secondary transportation for passenger).

The present disclosure further relates to systems and methods for detecting when an aircraft is deviating from a direct flight path, such as when the aircraft is in a holding pattern. By quickly determining when an aircraft is in a holding pattern, improvements to the ability to predict the effects of the held aircraft on other aircraft can be realized. For example, when X aircraft are in holding patterns around an airport, being able to detect that those aircraft are in holding patterns rather than on approach to land (or in takeoff) sooner allows other aircraft destined for that airport to make the decision to divert sooner, and thus to save fuel and reduce congestion at that airport (instead of having X+1 aircraft in holding patterns) among other benefits.

Figure 1:
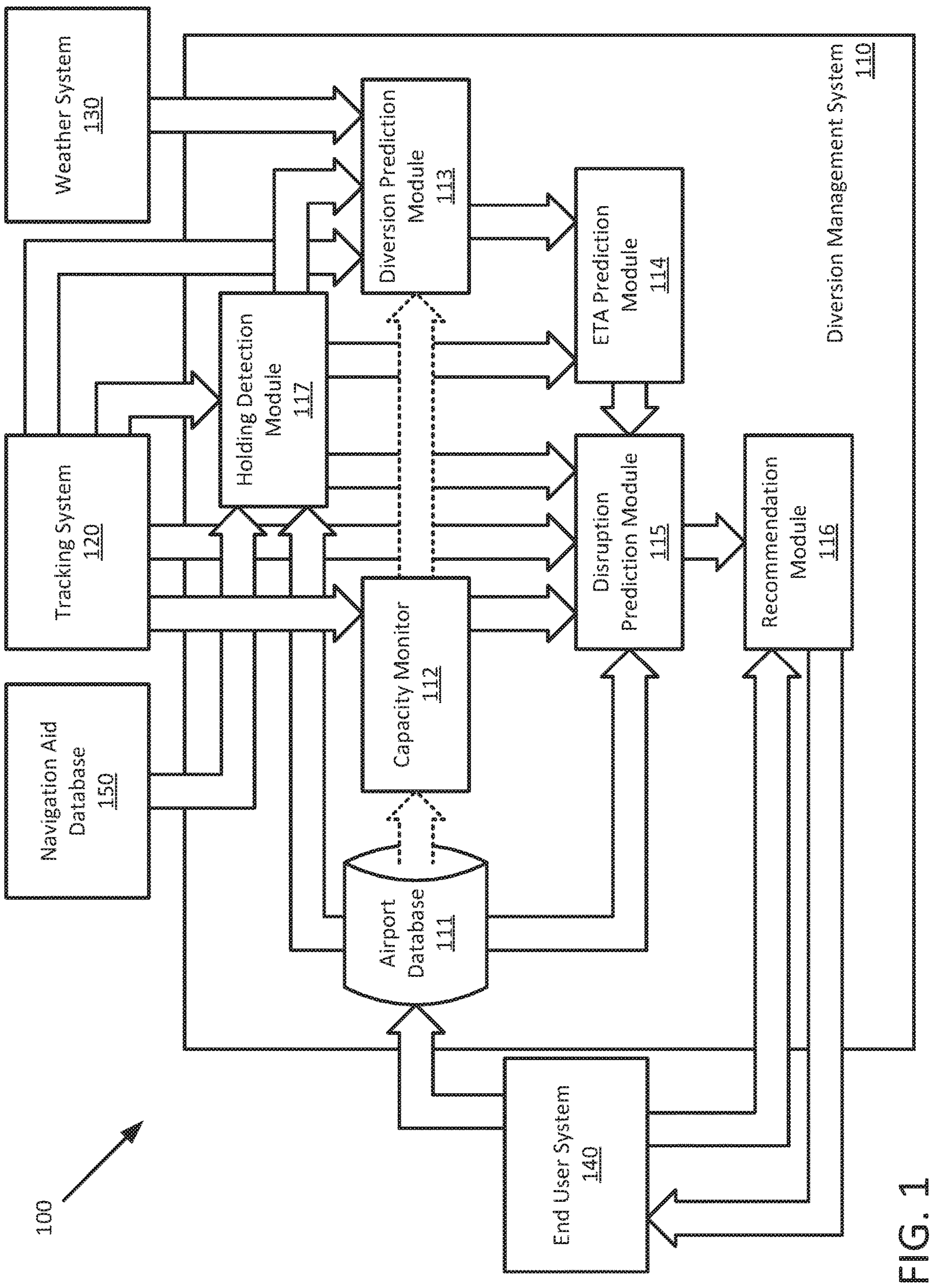
FIG. 1 illustrates a holding detection and diversion prediction environment, according to aspects of the present disclosure.

FIG. 1 illustrates a diversion prediction environment 100, according to aspects of the present disclosure. A diversion management system 110 is provided on a computing device, (such as a computing device 700, which is discussed in greater detail herein in regard to FIG. 7) to proactively manage flights predicted to be at risk for diversion. The diversion management system 110 is in communication with a tracking system 120, a weather system 130, an end-user system 140, and a navigation aid database 150, which may be included on the same computing device as the diversion management system 110 and/or one another, or on separate computing devices. Additionally, although illustrated as individual systems, each of the diversion management system 110, tracking system 120, weather system 130, end-user system 140, and navigation aid database 150 may represent one or a plurality of individual systems of the indicated type which may be provided by an individual computing device or by a distributed computing environment. When provided by separate devices, the various systems are communicatively connected to one another by one or more of a wireless or wired network, broadcast services, and beamed services (e.g., directed satellite communication and microwave point-to-point communications).

The tracking system 120 provides flight tracking data from various aircraft in a zone of aircraft control for the diversion management system 110. In various aspects, the tracking data may include ADS-B data, radar positioning data, transponder data, and other data that indicate where an aircraft is located (including altitude), the heading of the aircraft, and the speed at which the aircraft is traveling. For ADS-B data, the individual aircraft receive satellite positioning information to determine where that aircraft is currently located and the current velocity of that aircraft, which the individual aircraft broadcast for reception by one or more tracking systems 120.

In various aspects, the tracking system 120 receives the flight tracking data from all of the transmitting aircraft in the zone of aircraft control by various receivers at various geographic locations, which are then collated into a single dataset to observe the flight paths of all of the aircraft in the one of aircraft control. In various aspects, the zone of aircraft control is global (i.e., includes the tracking data for all actively transmitting or tracked aircraft), but may also be localized (e.g., all active/transmitting aircraft within a determined range of an airport or other navigational feature, within a country's airspace, within a region, etc.). In some aspects, the tracking data further identifies the particular aircraft (e.g., flight X operated by airline A), the type of aircraft and the operator of the aircraft, which the diversion management system 110 can correlate to known aircraft characteristics (e.g., carries X passengers, requires a runway at least Y m long, uses facilities in general aviation or associated with airline A or C (but not B)), the origin and destination (and any known waypoints) for the current (or original) flight plan for the aircraft, etc. These flight tracking data may further provide deviation data from the original flight plan; indicating to what extent the aircraft is off course (including flying at a different altitude than originally planned), ahead or behind of schedule, flying faster or slower than originally planned, or being directed to a different destination than originally planned.

The weather system 130 receives current weather data and weather forecast data (collectively, weather data) correlated to various locations in the zone of flight control. In various aspects, the weather data include METAR (Meteorological Aerodrome Reports) data, Terminal Aerodrome Forecasts (TAF) data, and other current, short-term, or long-term sets of information related to localized weather. The weather data may indicate one or more of: temperature; humidity; wind speed; chance of, amount of, and type of precipitation (e.g., rain, snow, hail); chance of lightning; and ground based conditions that may affect air patterns (e.g., volcanic eruptions, forest fires, floods), to name a few examples.

The end-user system 140 represents the computing systems of one or more flight dispatchers or aircrews (e.g., pilots, copilots, navigators, etc.). Flight dispatchers include Air Traffic Controllers (ATC), airport operators, and ground-based airline operators who have control over whether and where an aircraft is diverted.

The end-user systems 140 can indicate to the diversion management system 110 various requirements or reasons behind a diversion, and the various amenities and facilities at or near each airport. For example, a Fixed Base Operator (FBO) at a given airport may periodically update an airport database 111 with the conditions and services available at an associated airport. In another example, a fight controller for an airline may indicate that a given aircraft needs to be diverted due to a medical issue or technical issue on the aircraft so that the diversion management system 110 will recommend airports to divert to with appropriate resources to resolve the issue (e.g., medical or maintenance teams and facilities at or nearby the selected airport). The diversion management system 110, in turn, uses the received flight tracking data, weather data, knowledge of the airports in the airport database 111, and needs indicated by the end-user system 140 (if indicated), to determine one or more "best" airports to divert a given aircraft to, which are provided in a recommendation or alert to the end-user system 140 to select as the new destination for a flight.

The navigation aid database 150 provides historical data about navigational paths taken by aircraft, such as, for example, fixpoints where aircraft have been instructed to enter into holding patterns in the past or have been observed to be in holding patterns in the past.

To determine which airports are the "best" for a given potential diversion, the diversion management system 110 uses the received data to develop a holistic view of the current flight situation in a zone of aircraft control, such as by identifying where all of the aircraft are located and headed, identifying what resources remain available at each airport, and predicting how the aircraft and airports interact over time in view of the operations of those aircraft and airports.

The diversion management system 110 includes an airport database 111 that identifies what resources (e.g., number and lengths of runways, numbers and types of gates/terminals, maintenance facilities, fuel capacity, hangar space, customs stations) are available at each airport, and what services are located nearby each airport (e.g., ground transportation options, lodging options, medical services), and where each airport is located. End users may update, or a provider of the diversion management system 110 may curate, the airport database 111 to reflect the most recent conditions for one or more airports (e.g., when a new runway is opened, when a terminal is closed for remodeling).

In some aspects, a capacity monitor 112 receives the information about each airport from the airport database 111 and the flight tracking information from the tracking system 120 to determine a capacity rate for various metrics for the airports, such as, for example, the percentage of runways in use, the percentage of gates occupied by aircraft, the usage rate of the maintenance crews at the airport, etc., based on what aircraft arrived at what times from the flight tracking data received over time. The capacity monitor 112 provides an up-to-date data set of the airport operating conditions at each airport in the zone of flight control that indicate what services and resources are nominally available and what services are resources are expected to be in use or otherwise unavailable to incoming aircraft.

A diversion prediction module 113 receives the weather data, flight tracking data, holding determination data, and (optionally) the capacity rates of the airports to determine when an aircraft is likely to be diverted and what airports that aircraft is likely to be diverted to. An Estimated Time of Arrival (ETA) prediction module 114 determines what the ETAs are for aircraft that are determined to be likely to be diverted to each of the candidate airports identified by the diversion prediction module 113, and may also estimate how long an aircraft currently detected to be in a holding pattern will take to reach an intended destination. For example, when a diversion is predicted at airport A that affects aircraft X destined for airport A, the diversion prediction module 113 identifies airports B and C as candidate new destinations for aircraft X, and the ETA prediction module 114 can then determine the ETAs for aircraft X to airports B and C.

The disruption prediction module 115 receives capacity rates from the capacity monitor 112, the ETAs at the candidate airports from the ETA prediction module 114, the tracking data, holding determinations from the holding detection module 117, and the weather data to determine to what extent a diversion will disrupt operations at the airports. For example, if airport B is able to handle an additional n aircraft in the next hour but n+m aircraft are being diverted to airport B, airport B will experience disruptions and/or secondary diversions may be required (e.g., aircraft X is diverted to airport B and is later diverted to airport C). In another example, if airport C is able to land n aircraft within m minutes, and n or more aircraft are currently holding around airport C, an aircraft destined for airport C with an ETA of m or fewer minutes will likely experience a disruption unless given priority over a currently holding aircraft. The disruption prediction module 115 therefore provides these predictions to the recommendation module 116.

The recommendation module 116 ingests the requirements and preferences of the aircraft operators, the known and predicted destinations of all of the aircraft currently in the zone of aircraft control, and predicted disruption risks for all of the available airports in the zone of aircraft control, and determines which airports are the "best" diversion destinations for the collective aircraft that are predicted to be affected by the diversion event. For example, although aircraft X and aircraft Y may both be diverted from airport A to either airport B or airport C due to the same diversion event, the recommendation module 116 may recommend that aircraft X to be diverted to airport B and aircraft Y to be diverted to airport C. When recommending which airports individual aircraft are diverted to, the recommendation module 116 weighs the preferences of the aircraft operators and the disruption to the total air traffic network (e.g., to not overwhelm a given airport) to identify to a flight dispatcher one or more preferred airports to divert a given aircraft to in response to a diversion event. The recommendation module 116 also considers the requirements of the individual aircraft, for example, if aircraft X requires a sufficiently long runway, sufficiently large gateway parking spot or other berth, a customs checkpoint, or other resource that airport B lacks, the recommendation module 116 will not recommend that aircraft X be diverted to airport B.

By predicting a diversion event instead of waiting for the event to occur, the diversion management system 110 can select from a greater number of airports to divert an aircraft to, and divert those aircraft sooner, which beneficially results in passengers reaching intended destinations sooner, flight crews being on-duty for less time, less stress on mechanical systems, less fuel consumption, etc.

By monitoring all of the aircraft and the airports in the zone of flight control, the diversion management system 110 can spread and thereby mitigate the effects of a diversion event (predicted or currently occurring) from the affected airport over the zone of flight control. For example, when a diversion event (e.g., a thunderstorm) causes flights originally destined for airport A to be diverted, the diversion management system 110 can identify airports en route (i.e., within a predefined distance of the current flight path) for the various aircraft bound for airport A, and spread the aircraft among the new destinations to thereby reduce the risk of disruption to any individual new destination and to the passengers and crew aboard the aircraft. To select the new destinations as early as possible and thereby reduce disruption for passengers, airlines, and airports, the diversion management system 110 trains several Artificial Intelligence (AI) models to predict the diversion events as early as possible.

Figure 2A:
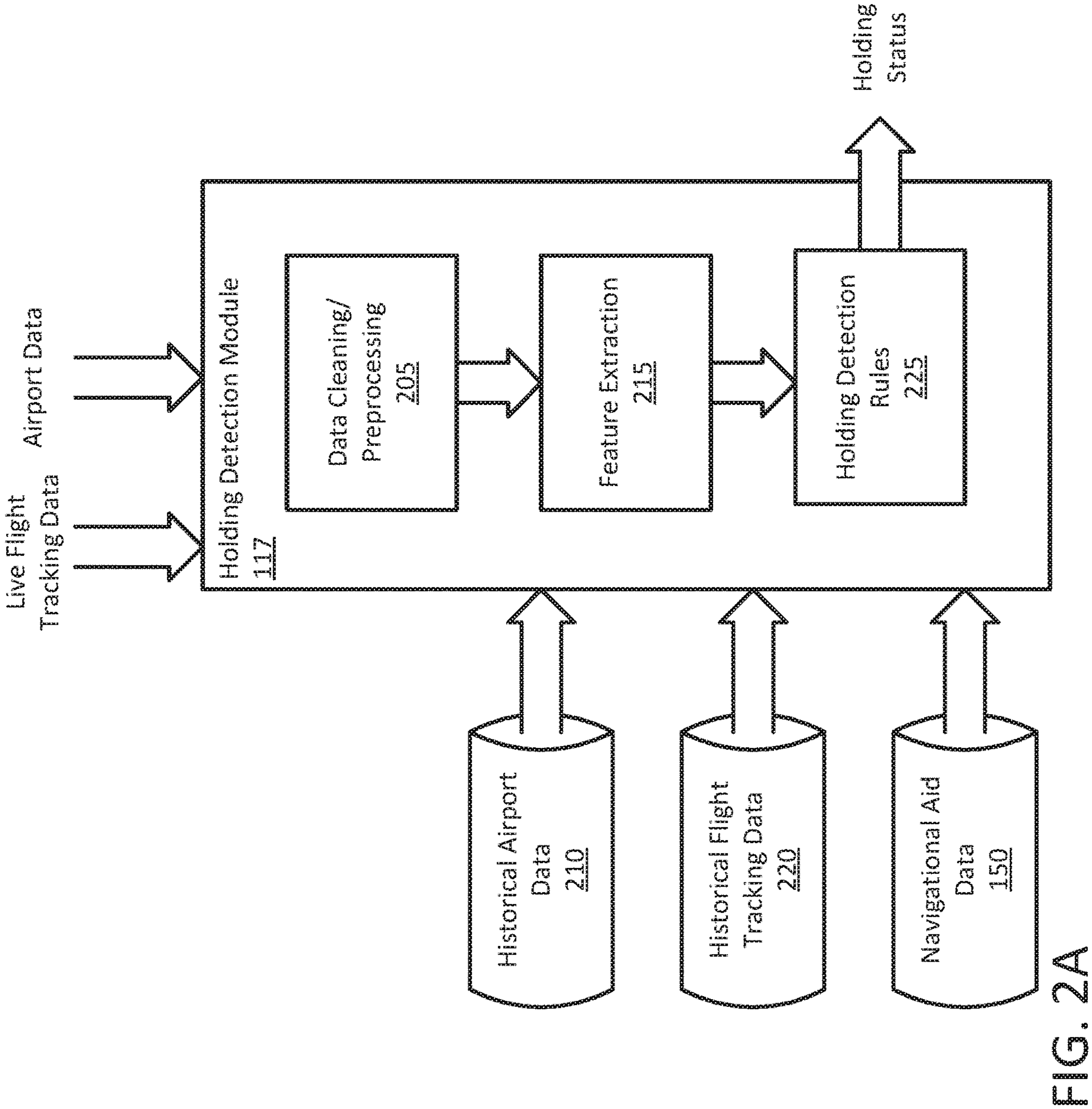
FIG. 2A illustrates a detailed view of the holding detection module, according to aspects of the present disclosure.

FIG. 2A illustrates a detailed view of the holding detection module 117, according to aspects of the present disclosure. When active, the holding detection module 117 may receive, for example, live flight tracking data and live airport data, as well as historical airport data 210, historical flight tracking data 220, and navigations aid data 150 to determine whether a given aircraft is actively progressing towards a destination, or is in a holding pattern. In various aspects, the holding detection module 117 uses the most up-to-date live data available for the live data, such as when a data feed is interrupted. A data cleaning/preprocessing module 205 standardizes and establishes a mutual relation between the received data to produce a dataset of a standardized format and time/location signature so that data received for different or offset locations and/or times can be compared to one another. Accordingly, data related to a first geographical region and a second geographical region that are noncontiguous or partially contiguous and/or data received at different rates and/or different times can be combined together to provide a coherent and standardized data set for later analysis.

A feature extraction module 215 identifies portions of the dataset that are used by the holding detection rules to identify whether a flight is in a holding pattern or performing another maneuver to progress towards a destination. For the holding detection module 117, the feature extraction module 215 extracts one or more of: a trajectory shape for the flight path for an aircraft (including turns and straight legs that are subsets of the trajectory), a distance from the origin of an aircraft, an altitude of an aircraft, a location of an aircraft, and a location of a fixpoint and other navigation aid at which previous holding patterns have been observed historically.

Data cleaning/preprocessing and feature extraction are used on live data as well as on the data of historical airport data 210, historical flight tracking data 220, and navigational aid data 150.

The holding detection rules 225 receive the extracted features to determine whether an aircraft is currently in a holding pattern. The determination may be output as a classification, such as “holding” or “not (yet) holding”, or output as a likelihood determination (e.g., x % likely to be holding). Performance of the holding detection rules 225 is discussed in greater detail in regards to FIGS. 8-11.

In various aspects, the holding detection rules 225 operate as a state machine based on the input data, indicating a state or status of the flight. For example, an aircraft may be identified to be in a null state, a first leg state, a second turn state, a second leg state, a turn state, and a leg state, where a determination that the aircraft is in a holding pattern is made when the aircraft is observed to advance to the second turn state. In another example, an aircraft may be identified to be in null state, a fixpoint state, a first turn state, and outbound state, an even turn state, an inbound state, and an odd turn state, where a determination that the aircraft is in a holding pattern is made when the aircraft is observed to advance to the outbound state. The aircraft may remain identified as in a holding pattern until the aircraft drops below a predefined altitude (e.g., when landing), proceeds a predefined distance away from an entry point of the holding pattern (e.g., from where a first turn began, which may vary in different directions based on the orientation and size of the holding pattern), is determined to be in a different holding pattern, or the like.

In some aspects, the historical flight tracking data 220 and holding status provide a supervised learning set; indicating whether a given aircraft in the historical data was determined to be in a holding pattern, which may be used to train machine learning models to identify locations and trajectories associated with fixed points a known holding pattern trajectories.

Figure 2B:
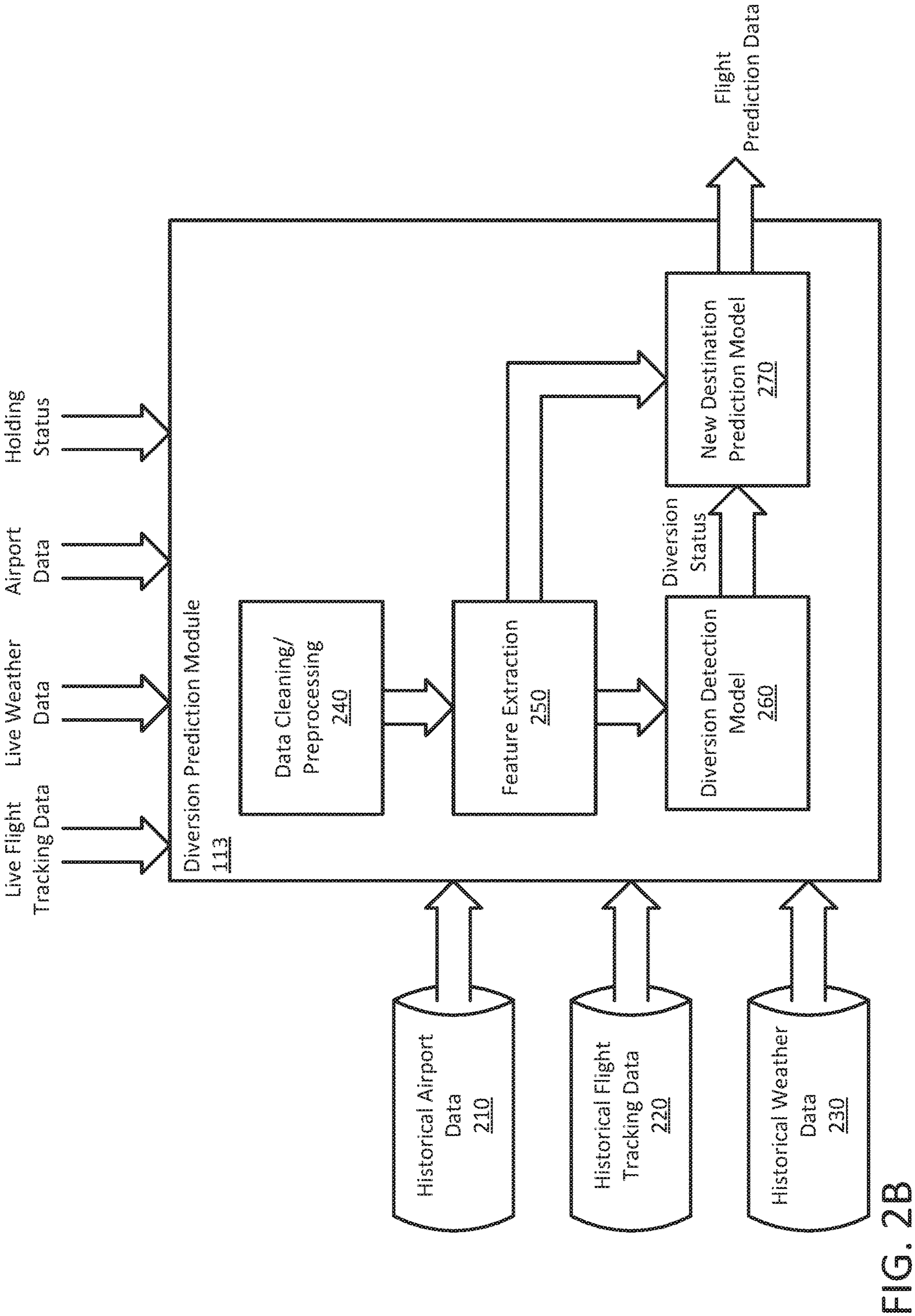
FIG. 2B illustrates a detailed view of the diversion prediction detection module, according to aspects of the present disclosure.

FIG. 2B illustrates a detailed view of the diversion prediction module 113, according to aspects of the present disclosure. When active, the diversion prediction module 113 may receive, for example, live airport data, live weather data, live flight tracking data, and live hold status data to produce flight prediction data that indicate a prediction of whether a given flight will be diverted and what airports that flight will be diverted to (if diverted). In various aspects, the diversion prediction module 113 uses the most up-to-date data available for the live data, such as when a data feed is interrupted. The flight prediction data indicate a diversion likelihood that exceeds a predefined likelihood threshold, and that a given aircraft should be directed to land at a different airport than the flight plan originally indicated. A data cleaning/preprocessing module 240 standardizes and establishes a mutual relation between the received data to produce a dataset of a standardized format and time/location signature so that data received for different or offset locations and/or times can be compared to one another. Accordingly, data related to a first geographical region and a second geographical region that are noncontiguous or partially contiguous and/or data received at different rates and/or different times can be combined together to provide a coherent and standardized data set for later analysis.

A feature extraction module 250 identifies portions of the dataset that are used by the AI models to identify and predict whether a flight will be diverted and, if so, to what diversion destination. For the diversion detection module 260, the feature extraction module 250 extracts one or more of: a trajectory shape for the flight plan for an aircraft, a distance and angle to the current destination for an aircraft, weather, a number of flights currently holding at an airport, the origin of an aircraft, an altitude of an aircraft, a location of an aircraft, and a heading of an aircraft. For the new destination prediction model 270, the feature extraction module 250 extracts one or more of: a trajectory shape for an aircraft, a distance and angle to the original destination, weather, a number of flights currently holding at an airport, the origin of an aircraft, an altitude of an aircraft, a location of an aircraft, and a heading of an aircraft.

Data cleaning/preprocessing and feature extraction are used on live data as well as on training data of historical airport data 210, historical flight tracking data 220, and historical weather data 230. The historical flight tracking data 220 provide a supervised learning set; indicating whether a given aircraft in the historical data was diverted and to which airport. The diversion prediction module 113 trains the AI models based on the supervised learning set, for example, by a random forest method that develops and compares several models and selects a most accurate model for use as the diversion detection module 260 and new destination prediction model 270, respectively.

When trained and active, the diversion detection module 260 receives the extracted features to predict whether an aircraft will be diverted before reaching the original destination. The prediction may be output as a classification, such as “divert” or “do not divert”, or output as a likelihood determination (e.g., x % likely to divert). During training, the diversion detection module 260 may develop a likelihood threshold for when to generate a diversion trigger (e.g., trigger when the likelihood of diversion exceeds y %), or may use a user-defined likelihood threshold.

When trained and active, the new destination prediction model 270 receives the extracted features from the feature extraction module 250 and the diversion prediction from the diversion detection module 260 to produce flight prediction data, which indicates one or more new destinations for all of the aircraft predicted to be diverted before reaching the original destinations.

Figure 3:
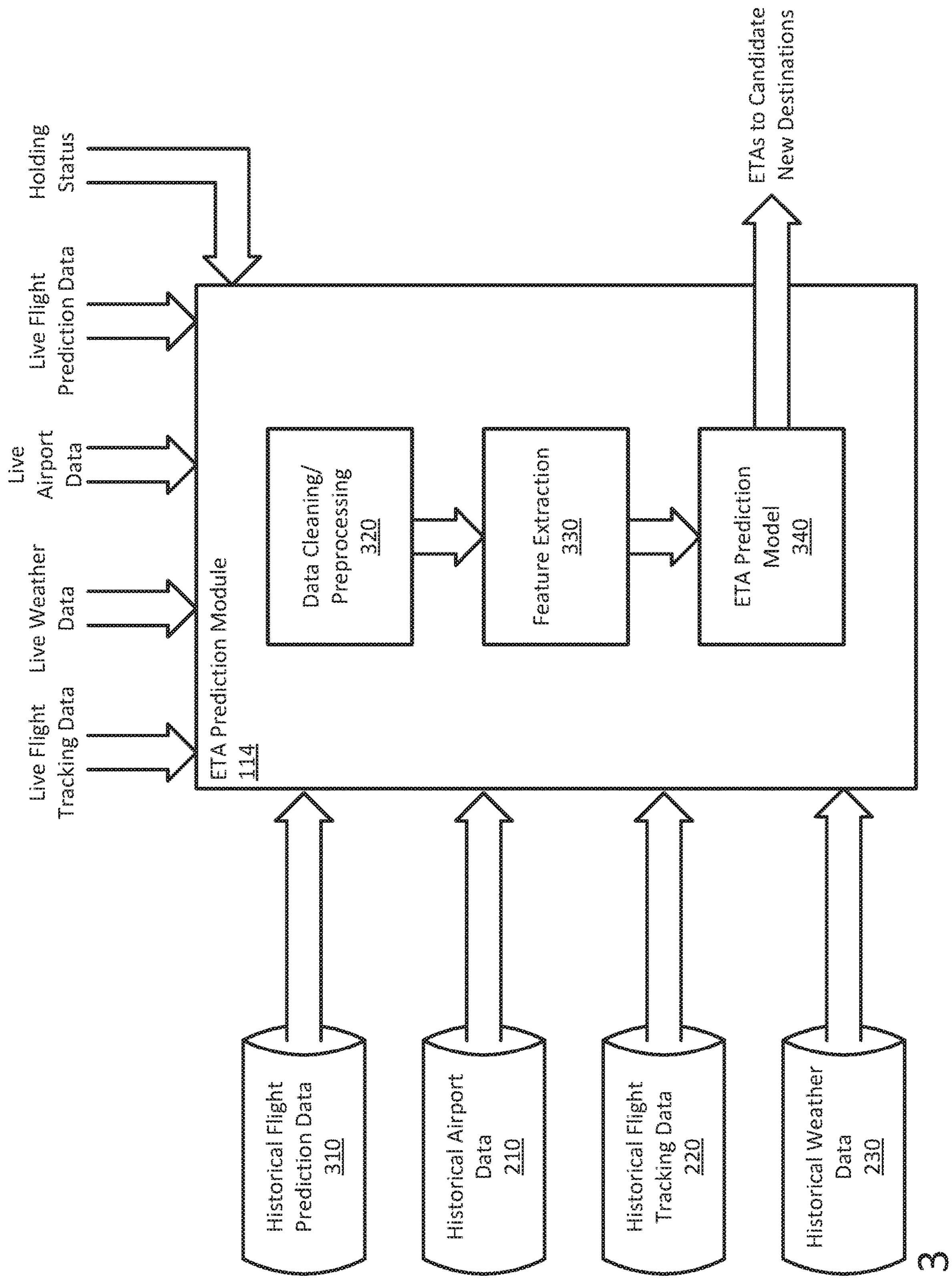
FIG. 3 illustrates a detailed view of the Estimated Time of Arrival prediction module, according to aspects of the present disclosure.

FIG. 3 illustrates a detailed view of the ETA prediction module 114, according to aspects of the present disclosure. When active, the ETA prediction module 114 may receive, for example, live airport data, live weather data, live flight tracking data, live hold status data, and live flight prediction data (from the diversion prediction module 113) to produce ETAs for the predicted diverted aircraft to the candidate new destination(s) identified by the diversion prediction module 113. A data cleaning/preprocessing module 320 standardizes and establishes a mutual relation between the received data to produce a dataset of a standardized format and time/location signature so that data received for different or offset locations and/or times can be compared to one another.

A feature extraction module 330 identifies portions of the dataset that are used by the AI models to identify and predict how long an aircraft will take to reach the candidate new destinations. For the ETA prediction model 340, the feature extraction module 330 extracts one or more of: weather, time of year/week/day, location of the aircraft, distance to the candidate new destination, a speed of the aircraft, an altitude of an aircraft, a heading of an aircraft, and traffic along the route or at the candidate new destination.

Data cleaning/preprocessing and feature extraction are used on live data as well as on training data of historical airport data 210, historical flight tracking data 220, historical weather data 230, and historical flight prediction data 310. The historical flight tracking data 220 provides a supervised learning set, which indicates how long a given aircraft took to actually reach a given destination for the given historical features. The ETA prediction module 114 trains the ETA prediction model 340 based on the supervised learning set, for example, by a random forest method that develops and compares several models and selects a most accurate model for use as the ETA prediction model 340.

When trained and active, the ETA prediction model 340 receives the extracted features to predict how long a given aircraft will take to reach a candidate new destination. The prediction may be output as a time-until-destination reached measurement, which may include a confidence score or error range in the estimated time of arrival at each of the candidate new destinations. The predicted ETAs for the aircraft to reach the candidate new destinations update the live flight prediction data, and may be added to the historical flight prediction data 310 for future training purposes.

Figure 4:
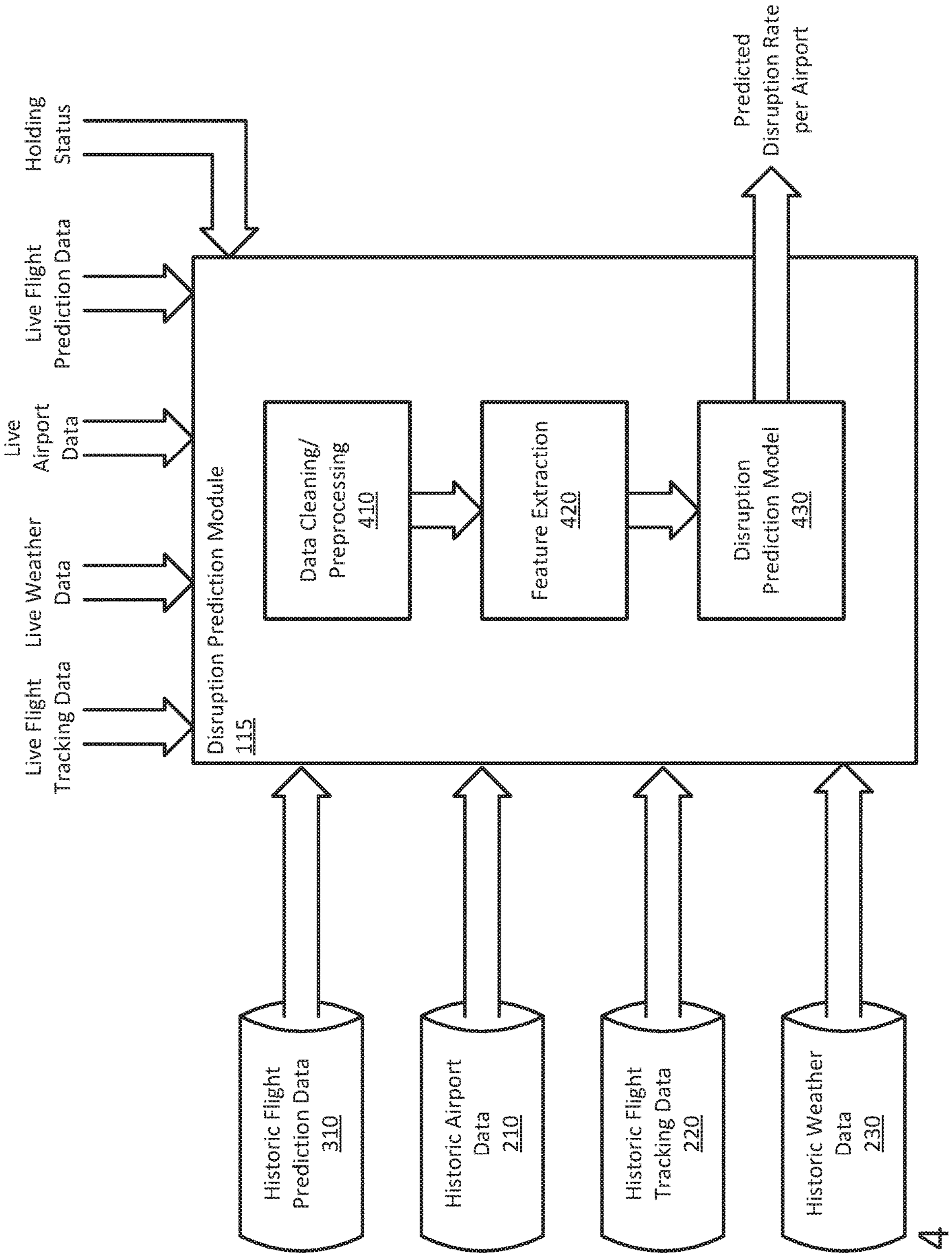
FIG. 4 illustrates a detailed view of the disruption prediction module, according to aspects of the present disclosure.

FIG. 4 illustrates a detailed view of the disruption prediction module 115, according to aspects of the present disclosure. When active, the disruption prediction module 115 may receive, for example, live airport data, live weather data, live flight tracking data, live hold status data, and live flight prediction data (including the predicted ETAs to the candidate destinations from the ETA prediction module 114) to produce predicted disruption rates at each airport in the zone of aircraft control. In some aspects, the disruption prediction module 115 outputs several time-bound disruption predictions for each airport (e.g., a likelihood of disruption within the next h hours, the next 2 h hours, etc.). A data cleaning/preprocessing module 410 standardizes and establishes a mutual relation between the received data to produce a dataset of a standardized format and time/location signature so that data received for different or offset locations and/or times can be compared to one another.

A feature extraction module 420 identifies portions of the dataset that are used by the AI models to identify and predict how much disruption is expected to result at a given airport in the future due to the currently available live data and the predicted diversions. For the disruption prediction model 430, the feature extraction module 420 extracts one or more of: weather, aircraft holding at various airports, diversions (actual and predicted), delays from scheduled flight plans, traffic along the route or at various airports, ETAs for various aircraft (to original and candidate diversion destinations), flight schedules, and aircraft types (e.g., indicting size, number of passenger, amount of cargo, runway requirements, maintenance/fueling/hangar requirements).

Data cleaning/preprocessing and feature extraction are used on live data as well as on training data of historical airport data 210, historical flight tracking data 220, historical weather data 230, and historical flight prediction data 310. The historical flight tracking data 220 provide a supervised learning set, which indicates whether and how severe actual disruptions at individual airports were, which are used to tune the disruption prediction model 430 to predict upcoming disruptions based on the live data. The disruption prediction module 115 trains the disruption prediction model 430 based on the supervised learning set, for example, by a random forest method that develops and compares several models and selects a most accurate model for use as the disruption prediction model 430.

When trained and active, the disruption prediction model 430 receives the extracted features to predict whether a given airport will experience a disruption within an indicated time period, and how severe that disruption will be. The severity of a disruption can include a length of the disruption (including a start and an end time), a confidence in the disruption prediction, resource(s) affected by the disruption, and the like. The individual resources affected by a disruption may be identified based on resource availability, as identified by the capacity monitor 112 of FIG. 1 and the predicted resource consumption for the diverted aircraft.

For example, the disruption prediction model 430 may indicate that a disruption to airports A and B will be resolved after h hours at airport A and after 2*h* hours at airport B. In another example, the disruption prediction model 430 may indicate that airport C will be disruption free from the current time to until time $t_1$ and will experience a disruption from time $t_1$ to time $t_2$ affecting runways of type x, but will be disruption free from $t_0$ to time $t_2$ on runways of type y. In further aspects, the disruption prediction model 430 may predict the disruption likelihoods and severities of any predicted disruptions for various resources independently of one another. For example, the disruption prediction model 430 may predict that runways capable of receiving aircraft of types X and Y will be disrupted at airport A, but runways capable of receiving aircraft of type X (but not type Y) will not be disrupted at airport A in the same time period.

Figure 5:
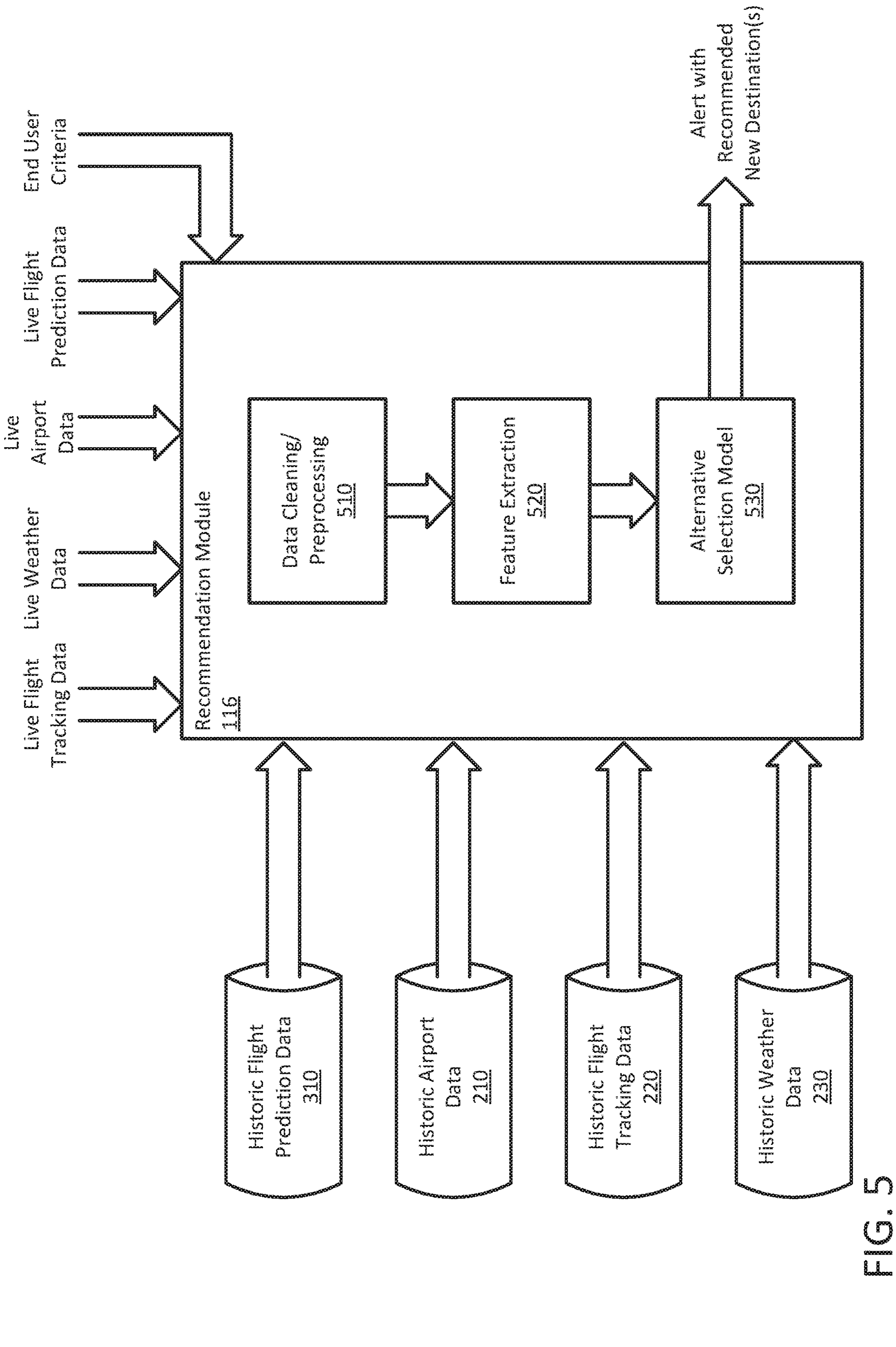
FIG. 5 illustrates a detailed view of the recommendation module, according to aspects of the present disclosure.

FIG. 5 illustrates a detailed view of the recommendation module 116, according to aspects of the present disclosure. When active, the recommendation module 116 may receive, for example, live airport data, live weather data, live flight tracking data, live flight prediction data (including the disruption predictions from the disruption prediction module 115), and end user criteria to identify one or more candidate airports to divert a given aircraft to in the event of a predicted or indicated diversion event (collectively referred to as a diversion trigger). In various aspects, the end user criteria indicate one or more of: a manually requested diversion (e.g., due to a mechanical or medical issue onboard the aircraft), preferences for the locations of diversion destinations (e.g., the closest destination to the current location, a closest destination to the original destination), preferences for facilities at diversion destinations (e.g.;

within a range of a hospital; servicing airlines A, B, or C; types of maintenance facilities present; backup flight crew present), etc. The recommendation module 116 produces an alert with one or more recommended new destinations for an aircraft, which are sent to end-user systems 140 (e.g., a flight computer for the aircraft in question, a dispatcher computer for an airline or an ATC) and can select a new destination for the aircraft to divert to. A data cleaning/preprocessing module 510 standardizes and establishes a mutual relation between the received data to produce a dataset of a standardized format and time/location signature so that data received for different or offset locations and/or times can be compared to one another.

A feature extraction module 520 identifies portions of the dataset that are used by the AI models to identify the "best" diversion destinations for diverting aircraft based on the currently available live data and the predicted diversions. For the alternative selection model 530, the feature extraction module 520 extracts one or more of: weather, aircraft holding at various airports, diversions (actual and predicted), delays from scheduled flight plans, traffic along the route or at various airports, ETAs for various aircraft (to original and candidate diversion destinations), flight schedules, aircraft types (e.g., indicting size, number of passenger, amount of cargo, runway requirements, maintenance/fueling/hangar requirements), levels of disruption (actual and predicted) at various airports, and services offered at or near various airports.

Data cleaning/preprocessing and feature extraction are used on live data as well as on training data of historical airport data 210, historical flight tracking data 220, historical weather data 230, and historical flight prediction data 310. The historical flight tracking data 220 provide a supervised learning set, which indicates which airports were presented to end users for previously predicted diversions and which candidate airports were selected by the end users in response to historical diversions, which are used to tune the alternative selection model 530 to identify airports as candidate diversion destinations in alerts sent to end users based on the live data. The recommendation module 116 trains the alternative selection model 530 based on the supervised learning set, for example, by a random forest method that develops and compares several models and selects a most accurate model for use as the alternative selection model 530.

When trained and active, the alternative selection model 530 receives the extracted features to determine a set of possible alternative airports for the destination for a flight that meet the end user's criteria (e.g., open/available for landing at the ETA, that can handle aircraft of a designated size and number of passengers, services and facilities available). The alternative selection model 530 predicts the conditions at each of the alternative airports at the ETA of the diverting aircraft at the alternative airports to determine which airports can be diverted to with the least disruption to the operation of the airport, the aircraft, and the passengers and/or cargo. For example, an airport that an airline frequently uses (and has associated ground crews, additional flight crews, etc. at that airport) may result in less disruption to the airline in handling later flights with that aircraft. In another example, an airport with the greatest free capacity may accept the diverted aircraft with the least disruption among the candidate airports (e.g., allowing the aircraft to land sooner and for passengers to find alternative transport sooner). In a further example, an alternative airport closest to the original destination airport may result in the least disruption to the passengers or cargo in reaching a final destination via ground transportation.

The alternative selection model 530 weighs the competing interests of airline disruption, airport disruption, and passenger disruption to identify a predefined number of candidate airports as the "best" alternatives to the end user. In some aspects, multiple instances of the alternative selection model 530 provide different weights to how the disruption is minimized to provide a corresponding number of "best" candidate airports according to each instance of the alternative selection model 530. For example, three instances of the alternative selection model 530 provide three "best" candidates by using different weights for how to prioritize reducing the disruption to the airline, airport, and to the passengers, respectively, which are provided to the end-user system 140 in one alert to select from.

In aspects providing multiple instances of the alternative selection model 530, the output of one instance may be the same or different from the output from another instance. For example, a first instance that prioritizes reducing the disruption to the airline and a second instance that prioritizes reducing the disruption to the passengers may both identify airport A as the "best" diversion destination, whereas a third instance that prioritizes reducing the disruption to the airport may identify airport B as the "best" diversion destination.

As new live data are received over time, the alternative selection model 530 may update the recommended destination as diversion events unfold. For example, a recommendation at time to based on live data received associated with time to may indicate that an aircraft can arrive at an original destination ahead of a weather event, resulting in no alert being generated. However, at time $t_1$, based on new data associated with a later time $t_1$, the alternative selection model 530 may determine that the aircraft now cannot arrive at the original destination ahead of the weather event (e.g., due to the weather cell moving faster or the aircraft moving slower than originally predicted) and therefore should be diverted to alternative airport A. Continuing the example, if at time $t_3$, the aircraft diverted to alternative airport A experiences another diverting event (e.g., a medical or mechanical issue) or conditions related to the original diverting event change, the alternative selection model 530 may identify alternative airport B as an alternative to airport A based on the live data associated with time $t_3$.

Because the diversion management system 110 has situational awareness for the entire zone of flight control (which may include global flight operations), in some aspects, the alternative selection model 530 recommends diversion destinations for aircraft based on the higher priorities of other aircraft in avoiding disruption to the traffic network. For example, if aircraft X and aircraft Y are both destined for airport A, and a thunderstorm is approaching airport A which will allow only one of aircraft X and aircraft Y to land before the weather event occurs, the alternative selection model 530 selects one of aircraft X and Y to divert. In some aspects, aircraft X may be scheduled to land at airport A before aircraft Y, but is diverted because aircraft Y carries more passengers, has stricter requirements for ground facilities (e.g., a customs entry point, a longer runway), has a higher priority diversion type (e.g., low fuel, medical or maintenance issue), has replacement crew waiting at airport A, has passengers to pick up at airport A, or the like.

In another example, when aircraft X and Y can both be diverted to either airport A or airport 8, the diversion management system 110 selects diversion destinations that result in a lowest total disruption to the passengers, crew, and airlines of aircrafts X and Y rather than selecting destinations based on individual potentials for disruption. By considering the total disruption rather than an aircraft-by-aircraft or airport-by-airport consideration of disruption, the diversion management system 110 can avoid diverting too many aircraft to a selected diversion destination, and thereby mitigate the risk of secondary diversions or increased delays at the diversion destination.

For example, consider the scenario in which diverting aircraft X or Y airport A would result in lower disruption to the respective passengers, crew, and airlines than diverting either aircraft X or Y to airport 8, but airport A can only accept one of aircraft X or Y in a given time window. In this scenario, the diversion management system 110 recommends that aircraft X be diverted to airport 8 and aircraft Y be diverted to airport A, which results in a lower total disruption to the parties than if both aircraft X and Y were diverted to airport A (or if aircraft X were diverted to airport A and aircraft Y were diverted to airport 8).

Accordingly, the diversion management system 110 provides a holistic management approach to the air traffic network, rather than an airport-by-airport or aircraft-by-aircraft management. Although the examples provided herein generally relate to one or two aircraft and one or two airports, a diversion management system 110 may track a zone of flight control with any number of aircraft and airports active therein.

Figure 6:
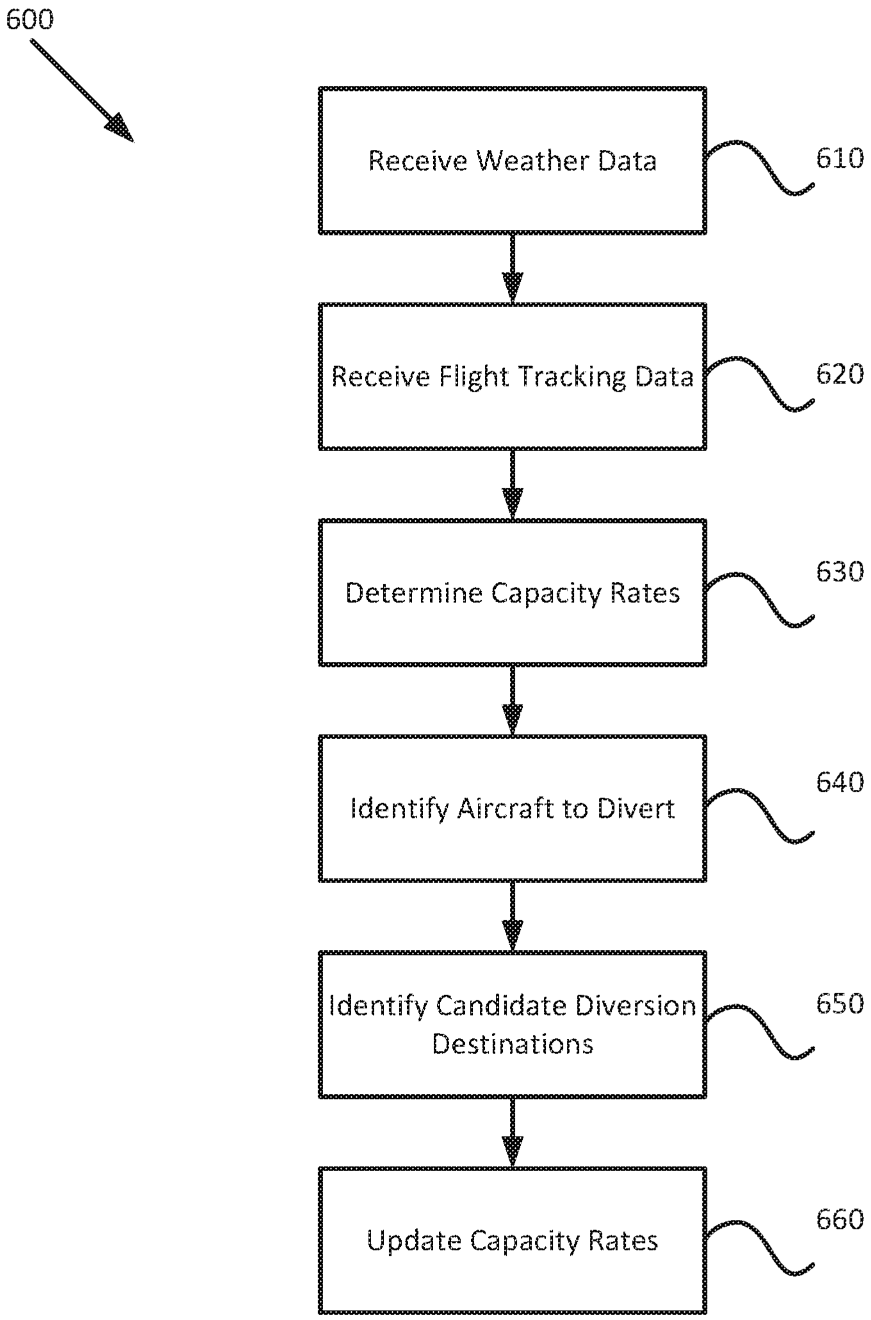
FIG. 6 is a flowchart of a method for predictive flight diversion management, according to aspects of the present disclosure.

FIG. 6 is a flowchart of a method 600 for predictive flight diversion management, according to aspects of the present disclosure.

Method 600 begins with blocks 610, where a diversion management system (such as may be described in regard to FIGS. 1-5), receives weather data for a zone of air traffic control. At block 620, the diversion management system receives flight tracking data for the aircraft travelling in the zone of air traffic control. Although illustrated and discussed in one sequence, blocks 610 and 620 may be performed substantially simultaneously in parallel, or with block 620 prior to block 610 in other aspects. The diversion management system may receive the weather and flight tracking data in real-time (or near real-time) as the data are gathered or may receive the weather and flight tracking data at periodic intervals (e.g., data collected and collated for a time window of s seconds, m minutes, or h hours and received at a corresponding frequency).

In some aspects, the flight tracking data include ADS-B data that specify positional data (e.g., latitude, longitude, altitude, speed, heading) for an aircraft, which may be supplemented with flight data the specify an original flight path (e.g., the original origins, waypoints, and destinations) and deviation information from the original flight path for each individual aircraft indicated in the flight tracking data. In some aspects, the ADS-B data are supplemented with hold status data, indicating whether a given aircraft is currently in a holding pattern within a given flight plan.

In various aspects, the zone of air traffic control includes global flight operations and the flight tracking data and weather data therefore, but may be localized to a bloc, country, region, or zone around a given airport in other aspects.

At block 630, the diversion management system determines capacity rates for the airports in the zone of air traffic control, based on the flight tracking data. The diversion management system observes which aircraft arrive at which airports from the flight tracking data and determines how those aircraft affect the baseline capacity indicated for each airport.

For example, the diversion management system obtains operating parameters for the airports including a quantity of active runways, a quantity of active terminals, and a quantity of hangar berths present at a given airport and, by observing flight tracking data over a predetermined time period (e.g., the last d days, the last w work days, the last e weekend days, the last h holidays), determines a number of active runways in use at an ETA for a particular aircraft to the given airport compared to the quantity of active runways, a number of active terminals in use at the ETA compared to the quantity of active terminals, and a number of hangar berths in use at the ETA compared to the quantity of hangar berths. The diversion management system may also receive capacity rate data from the airports (e.g., a fixed base operator may indicate that x runways are available at peak capacity or that y runways are available in a given time window). The diversion management system may track several capacity rates for the several airports in the zone of air traffic control, including, but not limited to: runway availability, terminal/gate availability, hangar/maintenance facility availability, refueling availability, hotel availability, ground transportation availability, maintenance crew availability, air crew availability, medical facility/crew availability, and customs officer availability.

In an additional example, the diversion management system tracks how many aircraft destined for a given airport are in holding patterns at the given airport or en route to the given airport to determine the capacity and back-logged demand for the capacity of the given airport.

At block 640, the diversion management system identifies aircraft to divert. In some aspects, the diversion management system identifies the aircraft based on a manually received diversion events, such as, for example, when a flight crew indicates that a medical issue has occurred aboard an aircraft, and that the aircraft needs to land sooner than originally planned. In other aspects, the diversion management system predicts that an aircraft will be affected by a diversion event (e.g., a developing weather event at the original destination, slower than expected operations at the original destination, a delayed flight cascading to affect incoming flights at the original destination), and generates a diversion trigger that identifies the aircraft and candidate new diversion destinations for that aircraft. The diversion trigger is generated by one or more AI models predicting a diversion event (e.g., the diversion detection module 260 and new destination prediction model 270 discussed in relation to FIG. 2), which the diversion management system uses as a basis for recommending new destinations to various flight dispatchers and air crews.

In some aspects, the diversion management system identifies all of the aircraft that are to be diverted in response to a diversion event and collectively identifies new destinations that those aircraft may be diverted to based on which airports satisfy operator requirements, including, for example: repair services offered, medical services offered, and alternative flights offered by a given aircraft operator. In other aspects, the diversion management system divides the plurality of aircraft to be diverted into prioritized subsets. For example, when aircraft X and Y are diverted due to a weather event, but aircraft Z is diverted due to a medical or maintenance event, the diversion management system may identify airports to divert aircraft Z to before analyzing the diversion candidates for aircraft X and Y due to a higher priority assigned to the diversion event affecting aircraft Z. Aircraft X and Y in this example may be diverted once a new destination has been assigned for aircraft Z in a subsequent iteration of method 600. Accordingly, the diversion management system may iteratively assign aircraft to new destinations as additional weather and flight tracking data are received and as earlier-diverted aircraft are accounted for at the newly assigned destinations for those diverted aircraft.

At block 650, the diversion management system identifies the candidate diversion destinations that produce the least disruption to the air traffic network. The diversion management system uses one or more AI models to identify, based on the predicted weather conditions at a predicted time of arrival for an aircraft at a candidate airport and the predicted capacity rate of the candidate airport at the predicted time of arrival for the given aircraft, which airports can receive a diverted aircraft and the effect of receiving that aircraft on the given airport. The diversion management system analyses the effects of diverting several aircraft to several candidate airports to identify, based on the currently available data, the assignments that result in the lowest total disruption across the air traffic network. By predicting the diversion events earlier, and spreading the aircraft affected by a diversion event among several airports, the diversion management system can reduce the impact of the diversion event on the air traffic network in the zone of aircraft control. In various aspects, the diversion management system identifies the recommended airports to divert an aircraft to by transmitting an alert to a flight dispatcher for the zone of air traffic control that indicates which aircraft are recommended to divert to which new destination airports. In some aspects, the diversion management system identifies the recommended airports to divert an aircraft to by transmitting an alert to a flight crew on an affected aircraft that identifies the recommended new destination airports for that aircraft.

At block 660, in response to receiving a selection of a given candidate new destination airport for a diverting aircraft, the diversion management system updates the capacity rates for the airports so that any aircraft that are to be diverted, but have not yet selected a new destination, and any aircraft that will be diverted due to future diversion events can be diverted to airports based on the most recent information about resource availability. Method 600 may then iterate again using the new capacity rates to identify new candidate destinations for aircraft to be diverted. Method 600 may also iterate again when new weather data are received (per block 610) or new flight tracking data are received (per block 620).

Figure 7:
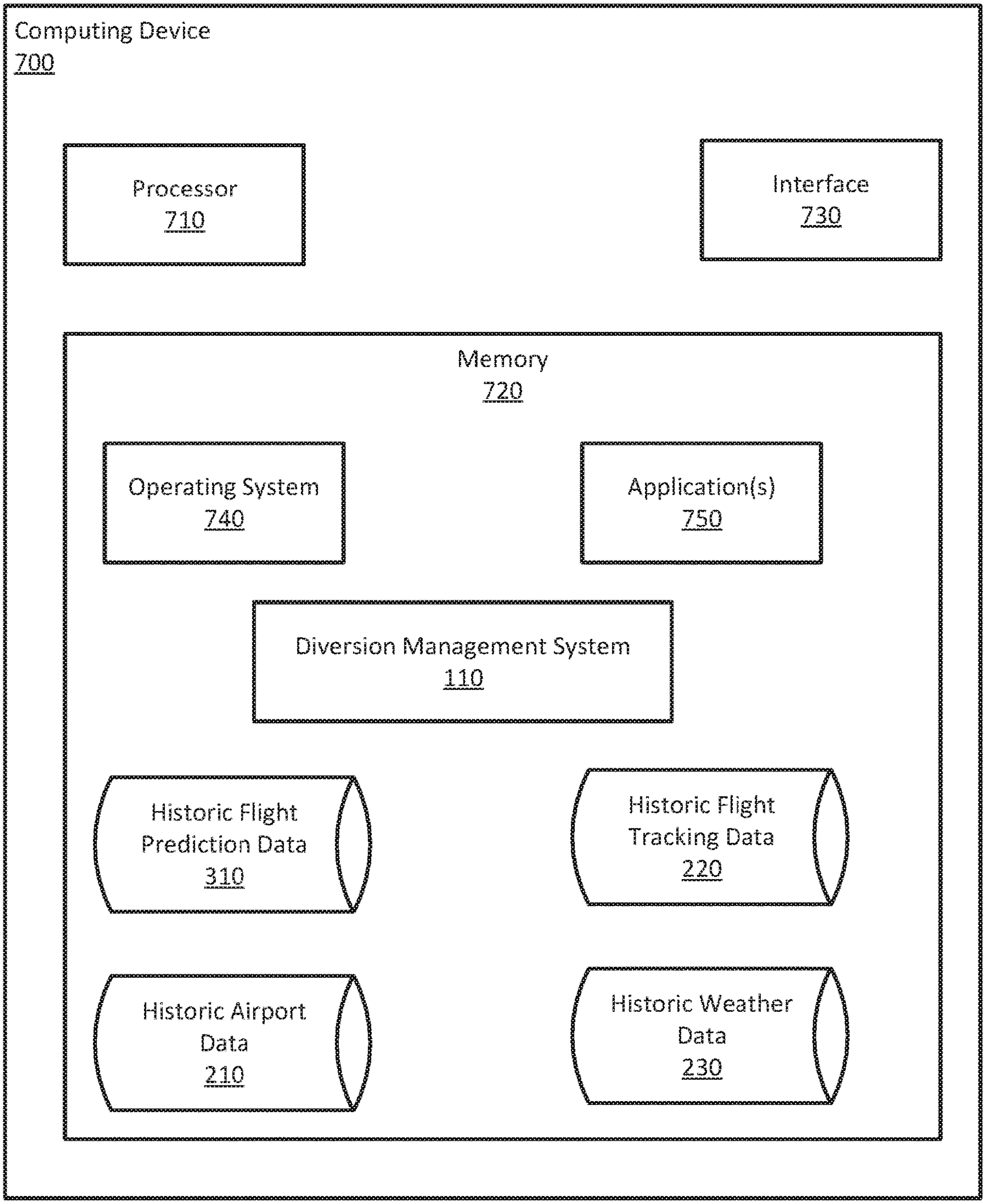
FIG. 7 illustrates example computing components of a computing system as may be used to provide predictive flight diversion management, according to aspects of the present disclosure.

FIG. 7 illustrates example computing components of a computing device 700 or other processing system as may be used to provide predictive flight diversion management as described in the present disclosure.

The computing device 700 includes a processor 710, a memory 720, and an interface 730. The processor 710 and the memory 720 provide computing functionality to run the AI modules to process real-time data and output diversion alerts.

The processor 710, which may be any computer processor capable of performing the functions described herein, executes commands based on inputs received from a user and the data received from the interface 730.

The interface 730 connects the computing device 700 to external devices, such as, for example, external memory devices, external computing devices, a power source, a wireless transmitter, etc., and may include various connection ports (e.g., Universal Serial Bus (USB), Firewire, Ethernet, coaxial jacks) and cabling. The interface 730 is used to receive the live data and to output diversion recommendations.

The memory 720 is a memory storage device that generally includes various processor-executable instructions, that when executed by the processor 710, perform the various functions related to predictive flight diversion management discussed herein. The processor-executable instructions may generally be described or organized into various "applications" or "modules" in the memory 720, although alternate implementations may have different functions and/or combinations of functions. The memory 720 also generally includes data structures that store information for use by or output by the various applications or modules. In the present disclosure, the memory 720 includes at least instructions for an operating system 740 and one or more application(s) 750. The memory 720 may be one or more memory devices, such as, for example, Random Access Memory (RAM), Read Only Memory (ROM), flash memory, or any other type of volatile or non-volatile storage medium that includes instructions that the processor 710 may execute.

When the computing device 700 provides the functionality of the diversion management system 110, the memory 720 includes processor executable instructions to provide an application for the diversion management system 110 (and the various AI models and modules included therein) and provide the functionalities described in the present disclosure. In some aspects, the memory 720 includes databases for the historical flight prediction data 310, the historical airport data 210, the historical flight tracking data 220, and the historical weather data 230 for use in training the AI models, but in other aspects the databases are maintained externally from the computing device 700 and are accessed via the interface 730.

Figure 8:
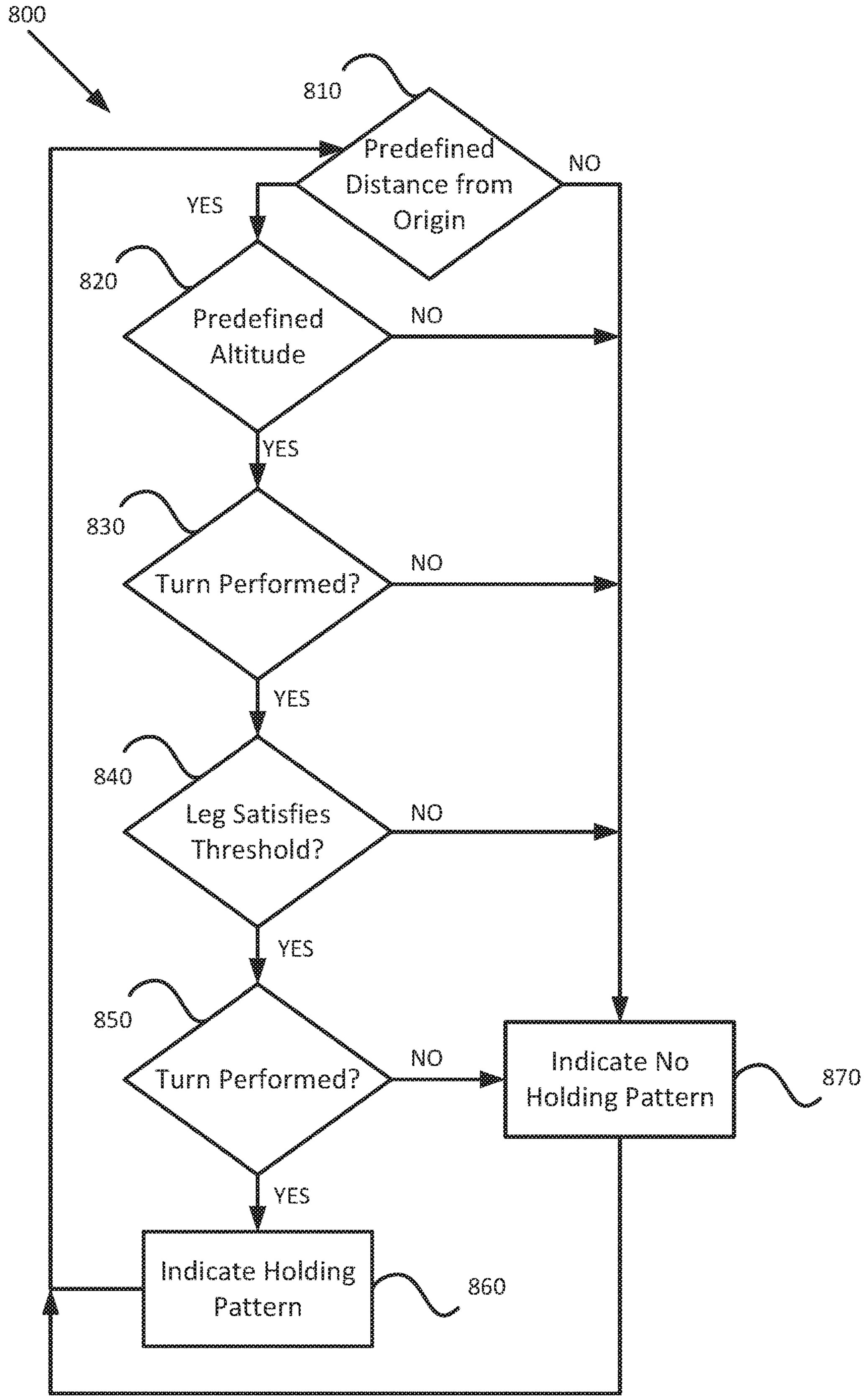
FIG. 8 is a flowchart of a method for detecting an aircraft in an uncharted holding pattern, according to aspects of the present disclosure.

FIG. 8 is a flowchart of a method 800 for detecting an aircraft in an uncharted holding pattern, according to aspects of the present disclosure. Method 800 represents one implementation of the holding detection rules applied by the holding detection module, which may apply several such rules in parallel at the same time to one aircraft and in parallel for several different aircraft.

Method 800 begins with block 810 where the holding detection module determines whether the aircraft is at least a predefined distance way from an origin of a flight plan. Because an aircraft may make several turns during as ascent phase, and will generally be held on the ground (e.g., to conserve fuel) rather than in the air in a holding pattern if congestion exists near the origin airport, the holding detection module may assume that the aircraft is not in a holding pattern until the aircraft is a least a predefined distance (e.g., 10 km) away from the origin airport. Accordingly, when the aircraft is less than the predefined distance from the origin airport, method 800 proceeds to block 870, where the holding detection module indicates that the aircraft is not in a holding pattern, or has not yet established a holding pattern.

At block 820, the holding detection module determines whether the aircraft is above a predefined altitude. When the aircraft is below the predefined altitude (e.g., 1000 m), the aircraft may be engaged in a takeoff or landing maneuver, and is therefore unlikely to be in a holding pattern. Accordingly, when the aircraft is below the threshold altitude, method 800 proceeds to block 870, where the holding detection module indicates that the aircraft is not in a holding pattern, or has not yet established a holding pattern.

At block 830, the holding detection module identifies from the flight data for the aircraft whether the aircraft has performed a first turn. A turn defines a change in direction or course from a straight leg of travel in the flight path of the aircraft, and may be planned or unplanned (i.e., indicated in a filed flight path or not). As a turn may be part of a holding pattern or a part of a progressive path towards a destination (e.g., around busy airspace, weather patterns, etc.), the holding detection module may update the state of the aircraft when the first turn is complete, but may refrain from indicating that the aircraft is in a holding pattern until other indicia are identified, and method 800 proceeds to block 840 to determine whether those other indicia are present. However, if the aircraft has not performed a turn, method 800 proceeds to block 870, where the holding detection module indicates that the aircraft is not in a holding pattern, or has not yet established a holding pattern.

In various aspects, a turn comprises a series of maneuvers that change the direction of the aircraft by between 90 and 270 (or −90) degrees from a previous course. The turn may be to the right (starboard) or to the left (port) from the perspective of the aircraft, and by convention the direction is determined by a change in rate between adjacent samples in the flight data in which a change in heading of more than X degrees per second (e.g., 0.4 deg/s) is considered rightward and a change in heading of less than −X degrees per second is considered leftward. To identify the beginning of a turn from a straight leg and differentiate the two segments of the aircraft's trajectory, the holding detection module may define a turn to be a sequence of flight samples in which the direction (e.g., left of right) of course change and the cumulative turn is more than an arc threshold of Y (e.g., 25) degrees. A leg would therefore include sequences of flight samples in which the cumulative turn rate is less than Y degrees before a course change in a different direction occurs.

At block 840, the holding detection module identifies from the flight data for the aircraft whether the aircraft has traversed a leg that satisfies a definitional threshold for a leg. In various aspects, when the aircraft travels along a course for longer than a distance threshold (e.g., 100 km) or continues to turn beyond an arc threshold (e.g., more than Y degrees), the holding detection modules determines that the aircraft's trajectory does not satisfy the leg threshold, and method 800 proceeds to block 870, where the holding detection module indicates that the aircraft is not in a holding pattern, or has not yet established a holding pattern. For example, the aircraft may have performed a turn (identified per block 830) that is part of a maneuver while on course to a destination, and the trajectory of the aircraft following the turn indicates that the aircraft is still en route, rather than one a leg in a holding pattern due to the aircraft holding course after the turn for too long or continuing to turn.

At block 850, the holding detection module identifies from the flight data for the aircraft whether the aircraft has performed a second turn that is circuitous to the first turn. A circuitous turn is a turn that forms a circuit with the first turn, such as (from the perspective of the aircraft) a first left turn and a second left turn that define a counterclockwise circuit, or a first right turn and a second right turn that define a clockwise circuit. As will be appreciated, as the flight data sampled the location of the aircraft, and minor variations in the trajectory of the aircraft are possible, the circuit need not be a closed loop, but may instead define a "spiral" type pattern. When the aircraft is determined to have performed a second turn, method 800 proceeds to block 860. However, if the aircraft has not performed a second turn, method 800 proceeds to block 870, where the holding detection module indicates that the aircraft is not in a holding pattern, or has not yet established a holding pattern.

At block 860 the holding detection module indicates that the aircraft is in a holding pattern. The holding detection module may continue to indicate the status of the aircraft as holding so long as the aircraft continues to travel in the holding pattern. Accordingly, method 800 may return to block 810 to monitor the status of the aircraft to ensure that the aircraft has not left the holding pattern (e.g., by beginning a descent phase or otherwise no longer following the circuit).

At block 870 the holding detection module indicates that the aircraft is not in a holding pattern, or has not yet established a holding pattern. Method 800 may return to block 810 to continue monitoring the aircraft to determine when the aircraft has established a holding pattern.

In various aspects, the holding detection module indicates that the aircraft is not in the hold pattern as a default value for the status of the aircraft that may be overridden by any one of several rule sets for hold pattern determination or by a prioritized rule set for hold pattern determination. For example, if method 800 were to indicate that a given aircraft is not in a holding pattern, but a different method (e.g., method 1000 discussed in relation to FIG. 10) were to indicate that the given aircraft is in a holding pattern, the holding detection module may indicate that the given aircraft is in a holding pattern despite method 800 not (yet) indicating that the given aircraft is in a holding pattern.

Figure 9:
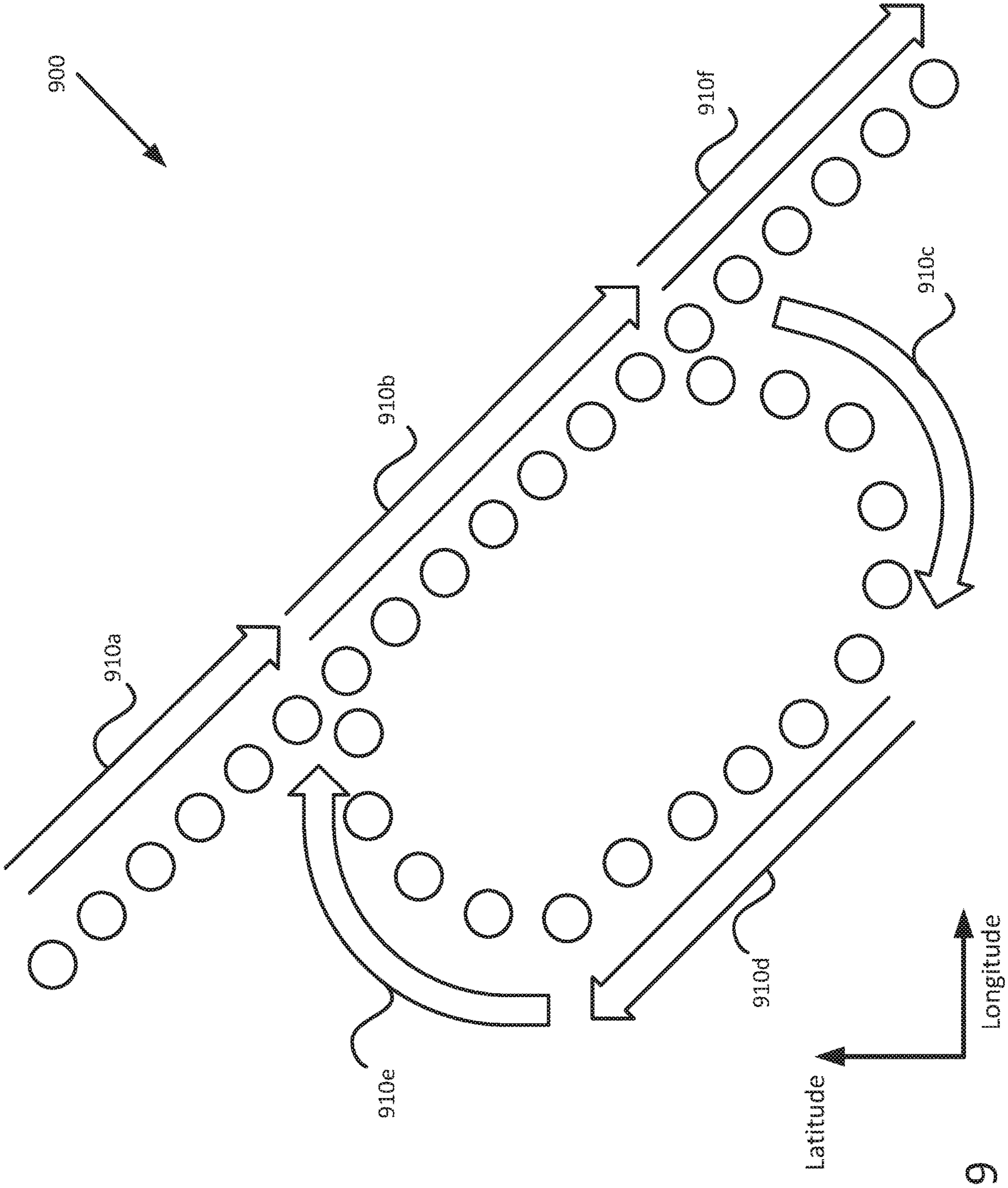
FIG. 9 is a flightpath diagram for an aircraft observed in an uncharted holding pattern, according to aspects of the present disclosure.

FIG. 9 is a flightpath diagram 900 for an aircraft observed in an uncharted holding pattern, such as may be determined according to method 800 described in relation to FIG. 8 and according to aspects of the present disclosure. The location of the aircraft is determined from reported flight data for the aircraft, indicated in the flightpath diagram 900 as circles at various latitudes and longitudes taken at various sampling times. The locations of the aircraft defines the flightpath of the aircraft, which is divided into several segments in FIG. 9 for explaining the determination of whether the aircraft is in a holding pattern.

An aircraft traveling along a trajectory with six segments 910*a-f* is shown. The aircraft travel along the first segment 910*a* and the second segment 910*b* before beginning a first turn in the third segment 910*c* (e.g., the first turn detected per block 830 in FIG. 8). The aircraft then traverses a leg in the opposite direction from the second segment 910*b* during the fourth segment 910*d* (e.g., the leg detected per block 840 in FIG. 8). The aircraft then begins a second turn in the fifth segment 910*e* (e.g., the second turn detected per block 850 in FIG. 8), at which time the holding detection module can determine that the aircraft is in a holding pattern (e.g., per block 860 in FIG. 8).

The aircraft can repeat one or more of the second through fifth segments 910*a-e* for multiple loops of the holding pattern before being signaled to resume travel to a destination (which may be the same or a different destination as when the holding pattern was entered into) and/or to land. As illustrated in FIG. 9, the sixth segment 910*f* indicates that aircraft continues in the same direction as the first segment 910*a* and the second segment 910*b* after leaving the holding pattern, but other aspects, the aircraft may exit the holding pattern by proceeding in a different direction or descending below a threshold altitude (e.g., as part of landing procedures).

Figure 10:
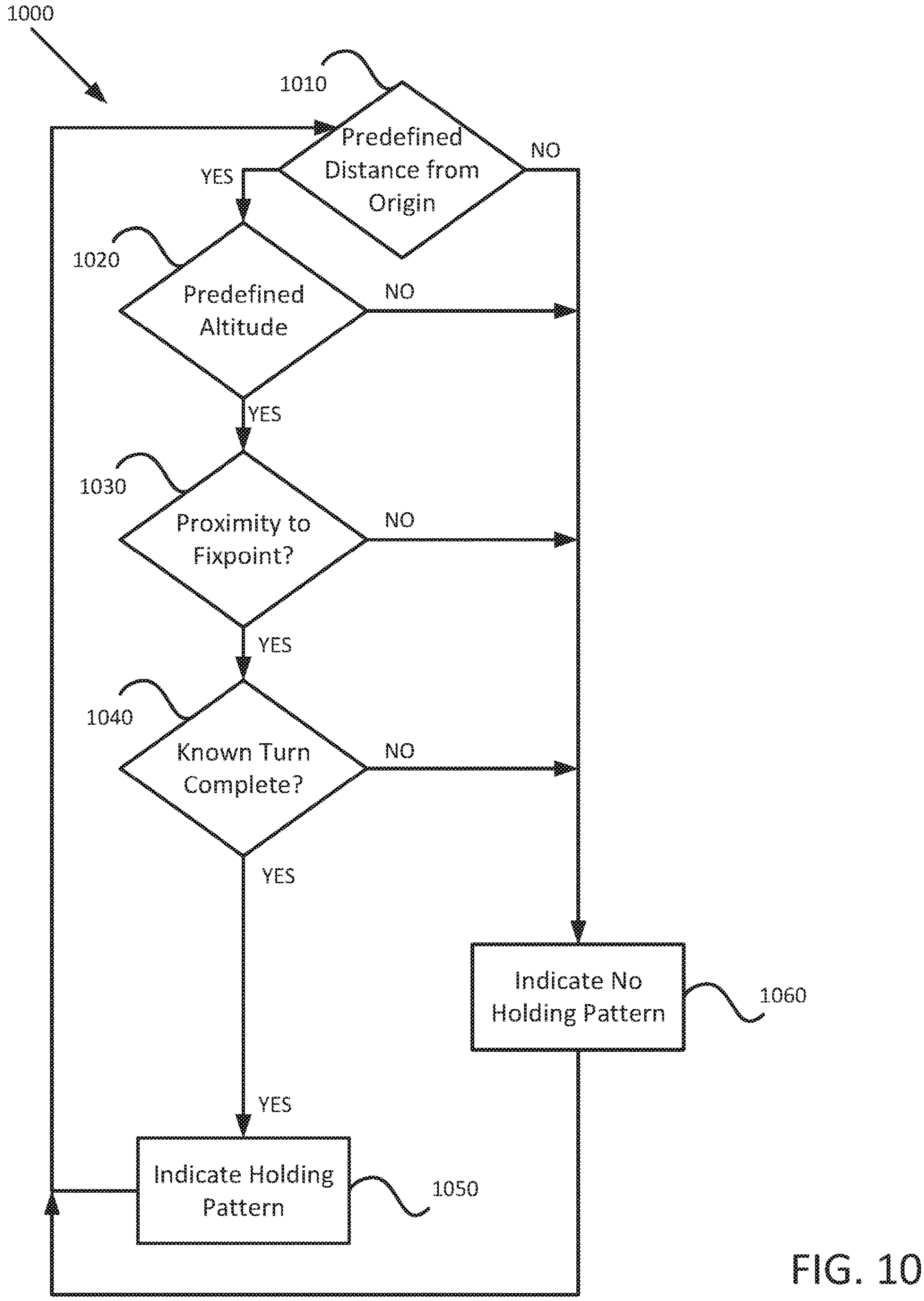
FIG. 10 is a flowchart of a method for detecting an aircraft in a charted holding pattern, according to aspects of the present disclosure.

FIG. 10 is a flowchart of a method 1000 for detecting an aircraft in a charted holding pattern, according to aspects of the present disclosure. Method 1000 represents one implementation of the holding detection rules applied by the holding detection module, which may apply several such rules in parallel at the same time to one aircraft and in parallel for several different aircraft.

Method 1000 begins with block 810 where the holding detection module determines whether the aircraft is at least a predefined distance way from an origin of a flight plan. Because an aircraft may make several turns during as ascent phase, and will generally be held on the ground (e.g., to conserve fuel) rather than in the air in a holding pattern if congestion exists near the origin airport, the holding detection module may assume that the aircraft is not in a holding pattern until the aircraft is a least a predefined distance (e.g., 10 km) away from the origin airport. Accordingly, when the aircraft is less than the predefined distance from the origin airport, method 1000 proceeds to block 1060, where the holding detection module indicates that the aircraft is not in a holding pattern, or has not yet established a holding pattern.

At block 1020, the holding detection module determines whether the aircraft is above a predefined altitude. When the aircraft is below the predefined altitude (e.g., 1000 m), the aircraft may be engaged in a takeoff or landing maneuver, and is therefore unlikely to be in a holding pattern. Accordingly, when the aircraft is below the threshold altitude, method 1000 proceeds to block 1060, where the holding detection module indicates that the aircraft is not in a holding pattern, or has not yet established a holding pattern.

At block 1030, the holding detection module identifies from the flight data for the aircraft that the aircraft has passed within a predefined distance (e.g., 0.5 km) of a fixpoint or other navigational aid associated with a known holding pattern trajectory. In various aspects, points or regions in space that have historically been identified with aircraft flying in a holding pattern are identified by a machine learning model so that when an aircraft reaches that point or region the holding detection module is put on alert for other behaviors indicative to the aircraft entering a hold pattern. For example, an air traffic controller may instruct several aircraft at different times to head to point X,Y (as an example fixpoint) and perform holding pattern maneuvers. When the holding detection module identifies that the aircraft has moved within a predefined proximity of a fixpoint, method 1000 proceeds to block 1040. Otherwise, method 1000 proceeds to block 1060, where the holding detection module indicates that the aircraft is not in a holding pattern, or has not yet established a holding pattern.

At block 1040, the holding detection module identifies whether the aircraft completes a turn in a known direction associated with a historical holding pattern previous charted from the fixpoint identified in block 1030. For example an air traffic controller may direct pilots to proceed to the fixpoint and then perform a turn for a specified amount of time or distance in a specified direction at a specified rate (e.g., head to point X,Y and turn westward for one minute). If the aircraft passes near the fixpoint, but either does not turn, or turns in a direction that does not correspond to historically observed holding patterns (e.g., turning eastward when aircraft have been observed turning westward when entering a holding pattern, performing too tight/not tight enough of a turn), method 1000 proceeds to block 1060, where the holding detection module indicates that the aircraft is not in a holding pattern, or has not yet established a holding pattern. When the holding detection module identifies that the aircraft has passed the fixpoint and completed a known turn associated with a holding pattern, method 1000 proceeds to block 1050.

At block 1050 the holding detection module indicates that the aircraft is in a holding pattern. The holding detection module may continue to indicate the status of the aircraft as holding so long as the aircraft continues to travel in the holding pattern. Accordingly, method 1000 may return to block 1010 to monitor the status of the aircraft to ensure that the aircraft has not left the holding pattern (e.g., by beginning a descent phase or otherwise no longer following the circuit).

At block 1060, the holding determination module indicates that the aircraft is not in a holding pattern, or has not yet established a holding pattern. Method 1000 may return to block 1010 to continue monitoring the aircraft to determine when the aircraft has established a holding pattern.

In various aspects, the holding detection module indicates that the aircraft is not in the hold pattern as a default value for the status of the aircraft that may be overridden by any one of several rule sets for hold pattern determination or by a prioritized rule set for hold pattern determination. For example, if method 1000 were to indicate that a given aircraft is not in a holding pattern, but a different method (e.g., method 800 discussed in relation to FIG. 8) were to indicate that the given aircraft is in a holding pattern, the holding detection module may indicate that the given aircraft is in a holding pattern despite method 1000 not (yet) indicating that the given aircraft is in a holding pattern.

Figure 11:
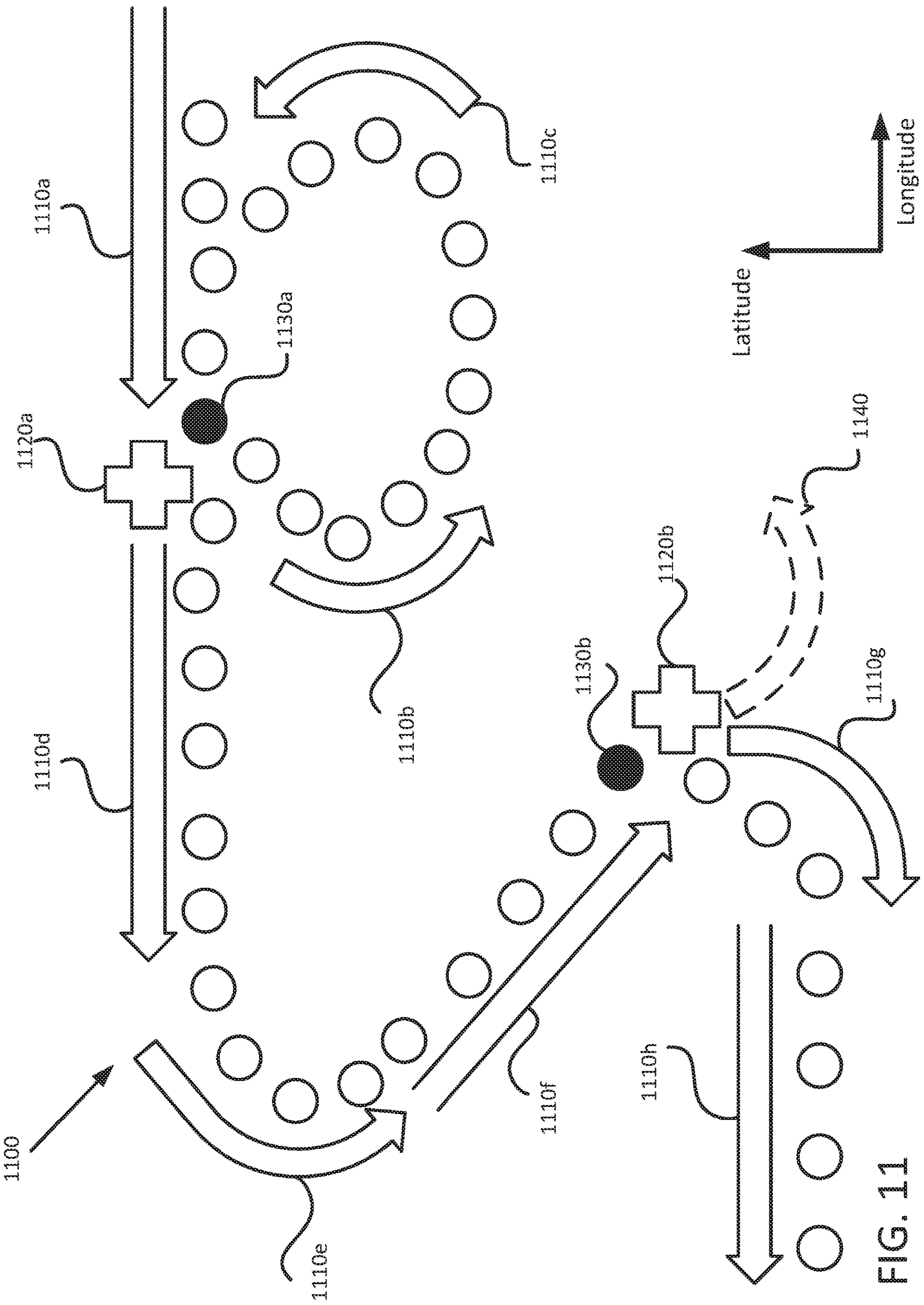
FIG. 11 is a flightpath diagram for an aircraft observed in a charted holding pattern, according to aspects of the present disclosure.

FIG. 11 is a flightpath diagram 1100 for an aircraft observed in a charted holding pattern, such as may be determined as according to method 1000 described in relation to FIG. 10 according to aspects of the present disclosure. The location of the aircraft is determined from reported flight data for the aircraft, indicated in the flightpath diagram 1000 as circles at various latitudes and longitudes taken at various sampling times. The locations of the aircraft defines the flightpath of the aircraft, which is divided into several segments 1110 in FIG. 1100 for explaining the determination of whether the aircraft is in a holding pattern. Additionally, the location of a first fixpoint 1120*a*, and a second fixpoint 1120*b* are shown, and a first proximity point 1130*a* in the reported flight data (near the first fixpoint 1120*a*) and a second proximity point 1130*b* in the reported flight data (near the second fixpoint 1120*b*) are also shown.

An aircraft traveling along a trajectory with eight segments 1110*a-h* is shown. The aircraft travel along the first segment 1110*a* until the aircraft reaches the first proximity point 1130*a* within a predefined distance of the first fixpoint 1120*a* (e.g., as per block 1030 in FIG. 1000). The aircraft then begins a first turn in a known direction from the first fixpoint 1120*a* along the second segment 1110*b* (e.g., as per block 1040 in FIG. 1000). When the known turn is complete, the holding detection module can determine that the aircraft is in a holding pattern (e.g., per block 1050 in FIG. 10).

Depending on the flightpath specified for the holding pattern, the aircraft may travel on an outbound leg for a specified amount of time or distance (see, the fourth segment 910*d* in FIG. 9, compared to an inbound leg of the second segment 910*b* in FIG. 9) defining a "racetrack" or oval flightpath for the holding pattern, or may begin a second turn after the first to define a circular flightpath for the holding pattern. The aircraft then begins a second turn in the third segment 1110*c*. The aircraft can repeat one or more of the second through third segments 1110*b-c* for multiple loops of the holding pattern before being signaled to resume travel to a destination (which may be the same or a different destination as when the holding pattern was entered into) and/or to land. The aircraft may be determined to have exited the holding pattern by being located more than a threshold distance from the fixpoint, a historically observed flightpath for the holding pattern, or descending below a threshold altitude (e.g., as part of landing procedures).

As illustrated in FIG. 11, the fourth segment 1110*d* indicates that aircraft continues in the same direction as the first segment 1110*a* after leaving the holding pattern, but other aspects, the aircraft may exit the holding pattern by proceeding in a different direction or descending below a threshold altitude (e.g., as part of landing procedures).

The aircraft may perform several other flight segments that include turns or straight legs (e.g., the fifth segment 1110*e* and the sixth segment 1110*f* respectively) and approach other fixpoints, such as the second fixpoint 1120*b*. As illustrated in FIG. 11, when the aircraft is located at the second proximity point 1130*b* near the second fixpoint 1120*b*, the aircraft turns right (from the aircraft's perspective) along a seventh segment 1110*g*, but a known turn 1140 associated with the second proximity point 1130*b* indicates that aircraft in holding patterns generally turn left. Therefore the holding detection module would determine that the aircraft is not in a holding pattern (e.g., per block 1040 and block 1060 of FIG. 10) after completing the turn. The aircraft then proceeds on the eighth segment 1110*h* away from the second fixpoint 1120*b*, although the aircraft may later be determined to have entered a holding pattern from that includes the seventh segment 1110*g* (e.g., as a first turn per method 800 of FIG. 8).

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF (Radio Frequency), etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:

identifying from live flight data for an aircraft that the aircraft has performed a first turn based on a sequence of flight samples from the live flight data indicating a first change in a direction relative to a first segment in a current trajectory of the aircraft, wherein the current trajectory is based on the live flight data;

identifying from the live flight data that the aircraft has performed a leg traverse in a second segment relative to the first segment and after performing the first turn;

identifying from the live flight data that the aircraft has performed a second turn after performing the leg traverse based on a second sequence of flight samples from the live flight data indicating a second change in the direction in relation to the first segment and the second segment of the current trajectory of the aircraft;

determining, from the live flight data and the current trajectory of the aircraft, whether the second turn comprises a circuitous turn from a perspective of the aircraft, the circuitous turn forming a circuit with the first turn, the first segment, and the second segment in the current trajectory of the aircraft;

generating, based on whether the second turn is determined to comprise a circuitous turn, a classification or a likelihood determination indicating that the aircraft is currently in an uncharted holding pattern;

determining a baseline effect for at least one airport based on the holding pattern; and diverting, based on the baseline effect, at least one aircraft traveling to the at least one airport to a new destination.

2. The method of claim 1, wherein the first turn and the second turn are identified as turns based on the flight data for the aircraft indicating that the aircraft performed a course change between 90 and 270 degrees from an input leg.

3. The method of claim 2, wherein a turn consists of a sequence of samples from the flight data in which a direction of the course change is constant.

4. The method of claim 2, wherein the leg traverse consists of a sequence of samples from the flight data in which a cumulative turn is less than a predefined arc threshold and a length of travel is less than a predefined distance threshold.

5. The method of claim 1, wherein the flight data indicate that the aircraft is at least a predefined distance from an origin airport and above a predefined altitude when indicating that the aircraft is in the holding pattern.

6. The method of claim 1, further comprising:

identifying an entry point of the holding pattern at which the first turn began; and continuing to indicate that the aircraft is in the holding pattern until the aircraft is a predefined distance away from the entry point or drops below a predefined altitude.

7. The method of claim 1, further comprising:

receiving weather data for a zone of air traffic control;

receiving flight tracking data for a plurality of aircraft travelling in the zone of air traffic control;

making holding determinations for the plurality of aircraft;

determining capacity rates for a plurality of airports in the zone of air traffic control, based on the flight tracking data; and in response to receiving a diversion trigger from a predictive model predicting a diversion event, identifying, based on the weather data, the flight tracking data, the holding determinations, and the capacity rates, a subset of aircraft from the plurality of aircraft that are to be diverted from original destinations in the zone of air traffic control to new destinations.

8. A method, comprising:

identifying from live flight data for an aircraft that the aircraft has passed within a predefined distance of a fixpoint in a first segment of a current trajectory of the aircraft based on a sequence of flight samples from the live flight data; and identifying from the live flight data that the aircraft has performed a turn relative to the first segment and in a known turn direction associated with a historical holding pattern charted from the fixpoint;

determining, from the live flight data and a trajectory of the aircraft, whether the known turn comprises a circuitous turn that forms a circuit with at least one additional turn in the trajectory of the aircraft, the first segment, and at least one leg segment;

generating, based on the historical holding pattern and whether the known turn is determined to comprise a circuitous turn, a classification or a likelihood determination indicating that the aircraft is currently in an uncharted holding pattern;

determining a baseline effect for at least one airport based on the holding pattern; and diverting, based on the baseline effect, at least one aircraft traveling to the at least one airport to a new destination.

9. The method of claim 8, further comprising:

identifying from flight data for the aircraft that the aircraft has passed within a second predefined distance of a second fixpoint; and in response to identifying from the flight data that the aircraft has performed a second turn that is not in a second known direction associated with a second historical holding pattern charted from the second fixpoint, indicating that the aircraft is not in a second holding pattern.

10. The method of claim 8, wherein the turn is identified based on the flight data for the aircraft indicating that the aircraft performed a course change between 90 and 270 degrees from an input leg.

11. The method of claim 8 wherein a turn consists of a sequence of samples from the flight data in which a direction of course change is constant.

12. The method of claim 8, wherein the flight data indicate that the aircraft is at least a predefined distance from an origin airport and above a predefined altitude when indicating that the aircraft is in the holding pattern.

13. The method of claim 8, further comprising: continuing to indicate that the aircraft is in the holding pattern until the aircraft is a predefined distance away from the fixpoint or drops below a predefined altitude.

14. The method of claim 8, further comprising:

receiving weather data for a zone of air traffic control;

receiving flight tracking data for a plurality of aircraft travelling in the zone of air traffic control;

making holding determinations for the plurality of aircraft;

determining capacity rates for a plurality of airports in the zone of air traffic control, based on the flight tracking data; and in response to receiving a diversion trigger from a predictive model predicting a diversion event, identifying, based on the weather data, the flight tracking data, the holding determinations, and the capacity rates, a subset of aircraft from the plurality of aircraft that are to be diverted from original destinations in the zone of air traffic control to new destinations.

15. A system, comprising:

a processor; and a memory storage device including instructions that when executed by the processor perform an operation comprising:

determining a holding pattern status from live flight tracking data, where the holding pattern status indicates whether each aircraft of a plurality of aircraft is progressing towards a destination or is in a holding pattern, wherein the live flight tracking data indicates that a particular aircraft of the plurality of aircraft is determined, based on a classification or a likelihood determination, to be in an uncharted holding pattern based on whether a trajectory of the aircraft is determined to comprise a circuitous turn that forms a circuit with a first turn in the trajectory of the aircraft, and with a leg traverse segment performed after the first turn;

determining diversion likelihoods for each aircraft of the plurality of aircraft diverting to a new destination airport based on weather data, flight tracking data, and the holding pattern status for the plurality of aircraft;

determining a disruption likelihood for each airport of a plurality of airports being disrupted by diverting aircraft of the plurality of aircraft to an individual airport based on the weather data, the flight tracking data, airport operating conditions, the holding pattern status, and the diversion likelihoods;

outputting a predefined number of candidate airports with lowest disruption likelihoods for each aircraft of the plurality of aircraft; and diverting at least one aircraft of the plurality of aircraft to an airport of the predefined number of candidate airports.

16. The system of claim 15, wherein the holding pattern for a given aircraft is identified by identifying from flight data for the given aircraft that the given aircraft has passed within a predefined distance of a fixpoint and performed a turn in a known direction associated with a historical holding pattern charted from the fixpoint.

17. The system of claim 15, wherein the operation further comprises determining an Estimated Time of Arrival (ETA) for each aircraft.

18. The system of claim 15, further comprising:

a diversion detection model, trained to predict when a given aircraft is to be diverted from an original destination based on the weather data, the flight tracking data, the holding determinations, and the airport operating conditions; and a new destination prediction model, trained to identify candidate airports to divert the given aircraft to based on the flight tracking data and airport operating conditions.

19. The system of claim 15, wherein the operation further comprises:

transmitting an alert to a flight dispatcher associated with a given diverted aircraft that identifies the predefined number of candidate airports;

receiving a selection of a given candidate airport from the flight dispatcher; and in response to receiving the selection, update the airport operating conditions based on the selection.

20. The system of claim 15, wherein the operation further comprises: maintaining the holding determinations until an associated aircraft descends below a threshold altitude or proceeds a defined distance from a flightpath for the holding pattern.

* * * * *